(12) United States Patent
Hao et al.

(10) Patent No.: US 11,776,263 B2
(45) Date of Patent: *Oct. 3, 2023

(54) BIDIRECTIONAL PAIRING ARCHITECTURE FOR OBJECT DETECTION IN VIDEO

(71) Applicant: Intel Corporation, Santa Clara, CA (US)

(72) Inventors: Yan Hao, Shanghai (CN); Zhi Yong Zhu, Shanghai (CN); Lu Li, Shanghai (CN); Ciyong Chen, Shanghai (CN); Kun Yu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/742,122

(22) Filed: May 11, 2022

(65) Prior Publication Data

US 2022/0270366 A1  Aug. 25, 2022

Related U.S. Application Data

(63) Continuation of application No. 17/059,968, filed as application No. PCT/CN2018/121736 on Dec. 18, 2018, now Pat. No. 11,354,903.

(51) Int. Cl.
*G06K 9/00* (2022.01)
*G06V 20/40* (2022.01)
(Continued)

(52) U.S. Cl.
CPC ............ *G06V 20/41* (2022.01); *G06F 18/213* (2023.01); *G06F 18/22* (2023.01); *G06V 10/761* (2022.01);
(Continued)

(58) Field of Classification Search
CPC ...... G06V 20/41; G06V 20/46; G06V 10/761; G06V 10/764; G06V 10/776; G06V 10/82; G06K 9/6215; G06K 9/6232
See application file for complete search history.

(56) References Cited

U.S. PATENT DOCUMENTS 9,965,719 B2 * 5/2018 Choi .................... G06T 7/73
2009/0141940 A1 * 6/2009 Zhao .................. G06V 10/772
382/103

(Continued)

FOREIGN PATENT DOCUMENTS

| CN | 106651877 | 5/2017 |
|---|---|---|
| CN | 107808111 | 3/2018 |
| WO | 2020047854 | 3/2020 |

OTHER PUBLICATIONS

International Preliminary Report on Patentability for PCT Application No. PCT/CN2018/121736, dated Jul. 1, 2021.

(Continued)

*Primary Examiner* — Dhaval V Patel
(74) *Attorney, Agent, or Firm* — Essential Patents Group, LLP

(57) ABSTRACT

Techniques related to training and implementing a bidirectional pairing architecture for object detection are discussed. Such techniques include generating a first enhanced feature map for each frame of a video sequence by processing the frames in a first direction, generating a second enhanced feature map for frame by processing the frames in a second direction opposite the first, and determining object detection information for each frame using the first and second enhanced feature map for the frame.

21 Claims, 11 Drawing Sheets

(51) Int. Cl.
  *G06F 18/22*   (2023.01)
  *G06F 18/213*  (2023.01)
  *G06V 10/74*   (2022.01)
  *G06V 10/764*  (2022.01)
  *G06V 10/776*  (2022.01)
  *G06V 10/82*   (2022.01)

(52) U.S. Cl.
  CPC .......... *G06V 10/764* (2022.01); *G06V 10/776* (2022.01); *G06V 10/82* (2022.01); *G06V 20/46* (2022.01)

(56) References Cited

U.S. PATENT DOCUMENTS

2017/0147905 A1* 5/2017 Huang ................ G06V 40/165
2021/0133461 A1* 5/2021 Ren ...................... G06T 7/11

OTHER PUBLICATIONS

International Search Report and Written Opinion for PCT Application No. PCT/CN2018/121736, dated May 29, 2019.
Notice of Allowance for U.S. Appl. No. 17/059,968, dated Feb. 17, 2022.
Office Action for U.S. Appl. No. 17/059,968, dated Oct. 22, 2021.
Anupama, R., et al., "Text recognition using deep BLSTM Networks", Proceedings of the Eighth International Conference on Advances in Pattern Recognition (ICAPR), 2015.
Chopra, S., et al., "Learning a similarity metric discriminatively, with application to face verification", CVPR, pp. 539-546, Washington DC, USA, 2005. IEEE Computer Society.
Dai, J., et al., "R-fcn: Object detection via region-based fully convolutional networks", NIPS, 2016.
He, K., et al., "Deep residual learning for image recognition", CVPR (2016).
Liu, W., et al., "SSD: Single shot multibox detector", ECCV, 2016.
Redmon, J., et al., "YOLO9000: Better, faster, stronger", CVPR, 2017.
Redmon, J., et al., "You only look once: Unified, real-time object detection", CVPR, 2016.
Ren, S., et al., "Faster r-cnn: Towards realtime object detection with region proposal networks", NIPS, 2015.
Simonyan, K., et al., "Very deep convolutional networks for large-scale image recognition", ICLR, 2015.
Szegedy, C., et al., "Going deeper with convolutions", CVPR, 2015.
Zagoruyko, S., et al., "Learning to compare imge patches via convolutional neural networks", IEEE Conference on Computer Vision and Pattern Recognition (CVPR), Jun. 2015.

* cited by examiner

BIDIRECTIONAL PAIRING ARCHITECTURE FOR OBJECT DETECTION IN VIDEO

CLAIM OF PRIORITY

This Application is a continuation of U.S. patent application Ser. No. 17/059,968, filed on Nov. 30, 2020 and titled "BIDIRECTIONAL PAIRING ARCHITECTURE FOR OBJECT IN VIDEO", which is a National Stage Entry of, and claims priority to, PCT Application No. PCT/CN2018/121736 filed on Dec. 18, 2018 and titled "BIDIRECTIONAL PAIRING ARCHITECTURE FOR OBJECT IN VIDEO", both are incorporated by reference in its entirety for all purposes.

BACKGROUND

Object detection, including offline object detection, in video has great practical value and application prospects. For example, object detection is an important prerequisite for many high-level visual processing and analysis tasks such as behavior analysis, criminal investigation, event detection, scene semantic understanding, video summary, video recommendation, person re-identification, etc. In some contexts, it is important to detect each object as much as possible such that false negatives are to be avoided and false positives are tolerable. For example, in criminal investigation fields, false negative detection in frames, particularly key frames, causes failed event detection or failure in semantic understanding of a scene, which ultimately increases criminal investigation difficulty. Other contexts for object detection also rely on low false negative rate detection in each frame such as automatic driving, robot vision, etc.

Current object detection techniques include still image detection and video detection. However, such techniques may fail to detect objects in a variety of situations such as when portions of the object are obscured by other objects. It may be advantageous to perform object detection with high accuracy and very low false negative rates. It is with respect to these and other considerations that the present improvements have been needed. Such improvements may become critical as the desire to perform object detection in video becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
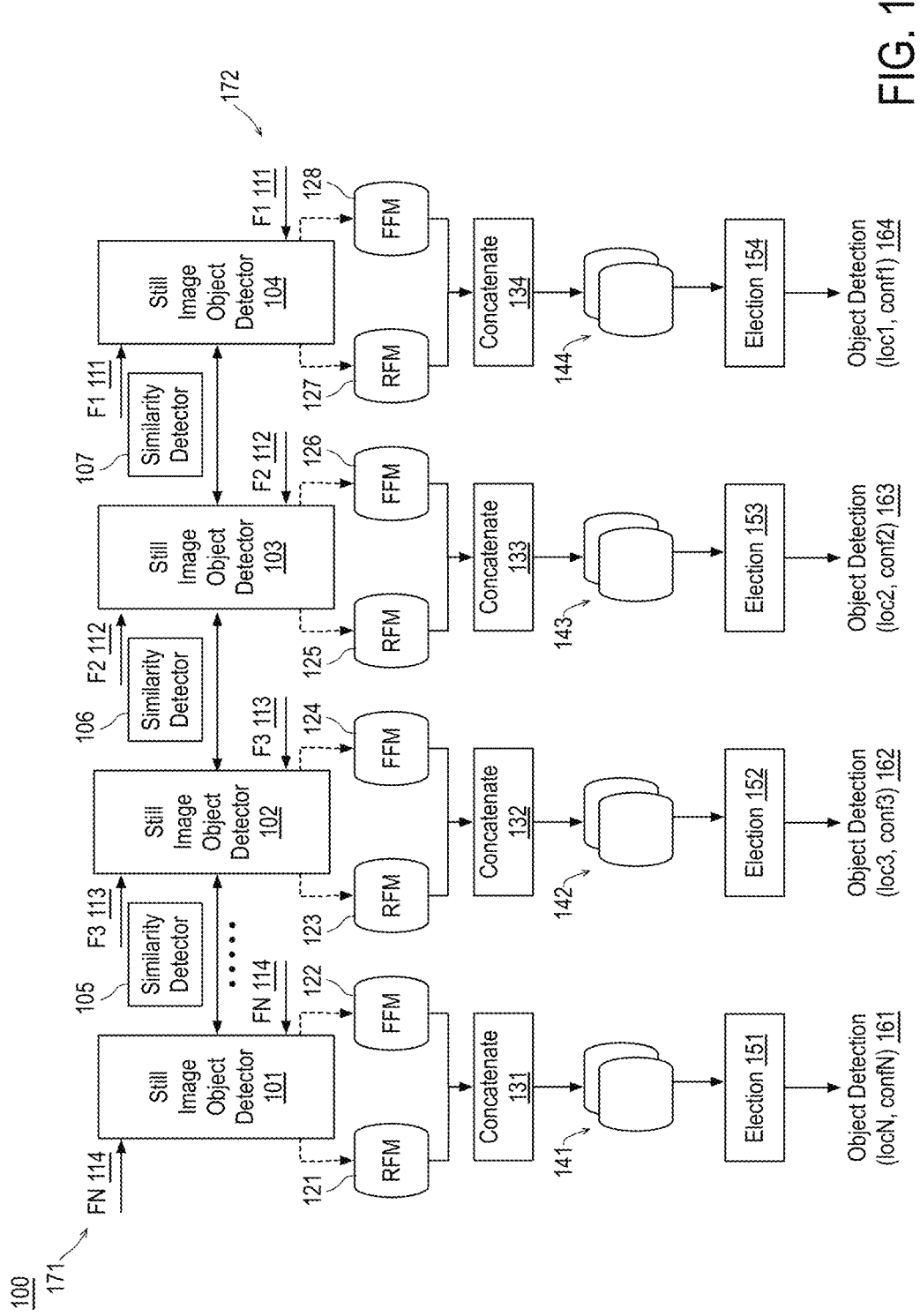
FIG. 1 illustrates an example device for performing object detection or recognition in video using a bidirectional pairing architecture.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to affect such feature, structure, or characteristic in connection with other implementations whether or not explicitly described herein. As used herein the terms "approximately" or "substantially" indicate a deviation from the target value of +1-5% unless otherwise specified.

Methods, devices, apparatuses, computing platforms, and articles are described herein related to bidirectional object recognition in video using still image object recognition on each frame and similarity detection between frames for improved object recognition.

As described above, it may be advantageous to perform object detection and recognition with very low false negative rates in a variety of contexts. As used herein, the terms object detection and object recognition are used interchangeably and indicate detecting or recognizing instances of objects of a certain class (e.g., humans, buildings, animals, cars, etc.) in digital video. The techniques discussed herein use bidirectional object recognition techniques for object detection. In particular, the discussed techniques consider successor and predecessor video information at the same time and detect key frames as much as possible to improve detection accuracy for video, such as offline video, to better support high-level visual processing tasks.

In some embodiments, still image object detection is performed on each of a current frame, a previous frame, and a subsequent frame of video (e.g., on all frames of a video sequence) to determine initial feature maps comprising object detection localization and confidence scoring for each of multiple potential object patches for the frames. As used herein, the term feature map indicates a tensor that contains prediction results (e.g., feature values) for a frame. The term prediction result indicates a detected class, a confidence score and, optionally, localization information. In some embodiments, a feature map may include multiple feature maps. For example, a feature map for a frame may include a confidence feature map (or confidence information) and a localization feature map (or localization information). The confidence feature map indicates what is detected (e.g., a class: person, building, car, background etc.) and the confidence in the detection (e.g., a score ranging from 0 to 1). For example, a person confidence map only includes person class and score combinations (e.g., "person", 0.78), while a car confidence map only includes car class and score combinations (e.g., "car", 0.91). For one-stage object detection (e.g., YOLO, SSD), the localization feature map indicates a location or location offset based on a bounding box of the detection. For example, each of any number of default or predefined bounding boxes may be defined and indexed. As used herein, the terms bounding box, region, and patch are used interchangeably. The localization feature map may then indicate the location (by index or coordinates) offset based on default or predefined bounding boxes of the features or information in the previously discusses confidence feature map. Together, the confidence feature map and localization feature map thereby provide a classification, confidence score, and localization offset based on some or all of the predefined bounding boxes. For two-stage object detection (e.g., RFCN), the localization feature map indicates a location, not location offset, because there are no default or predefined bounding boxes for two-stage object detection. For example, each such classification, confidence score, and localization offset based on default or predefined bounding boxes or localization may be characterized as a prediction result. Unless otherwise indicated, the discussion herein focuses on one-stage object detection.

After still image object detection, paired patches between the current and previous frames and paired patches between the current and subsequent frames, respectively, are detected. Thereby, forward and backward similar patches are detected. As used in this context, forward refers to forward direction along the video frames, while backward refers to the reverse direction along the video frames. As used in this context, forward and backward are not the same concepts for training a neural network. Notably, such processing is performed in a forward direction along the video frames and in a reverse (or backward) direction along the video frames. In some embodiments, the results of forward processing are cached for later use as backward processing is performed (or vice versa). Using the detected paired patches, updates may be made to the feature maps generated using still image detection. For example, for a pair of similar patches between the current frame and a previous frame, for the feature map of the current frame, a prediction result of the feature map may be updated if the confidence in the paired prediction (as previously stored in an enhanced feature map) result is higher. In some embodiments, if the preliminary feature map for the current frame has a particular patch as "dog", 0.5 and the paired patch from the previous frame is scored as "cat", 0.8, the prediction result for the preliminary feature map for the current frame is updated to "cat", 0.8 for that patch. As discussed, with respect to the current frame, such processing is performed in a forward direction (thus accumulating updates from all previous frames) as processing continues in a forward manner through all video frames. Then, such processing is performed in a reverse direction (thus accumulating updates from all subsequent frames) as processing continues in a reverse or backward manner through all video frames. As used herein, the terms forward, backward, etc. are meant to indicate bidirectional processing of video once along the temporal direction of video and once along the direction opposite the temporal direction. Such forward processing may be performed first and reverse processing may be performed second or vice versa throughout.

As discussed, the preliminary feature map for the current frame is updated through forward processing to generate a forward resultant or enhanced feature map. The preliminary feature map for the current frame is also updated through reverse processing to generate a reverse or enhanced resultant feature map. As noted above, both the forward and reverse feature maps may each include a confidence feature map and a localization feature map. Using the forward and reverse feature maps, object detection results for the current frame are generated. In some embodiments, the object detection results are generated by concatenating the forward and reverse feature maps and providing them to a pretrained neural network layer or layers (optionally including a softmax function). In other embodiments, the object detection results are generated by comparing shared object patches and retaining the prediction result having the higher confidence. For example, if a particular bounding box or patch has a score of "cat", 0.6 in the forward feature map and a result of "dog", 0.8 in the reverse feature map (e.g., the prediction results are for the same patch index), the prediction result of "dog", 0.8 is retained as an object detection result for the current frame. Thereby, a bidirectional enhanced feature map is generated for the frame. The output for the current frame may then include prediction results having confidence values exceeding a particular threshold, a top number of prediction results (prioritized by confidence values), or the like. In some embodiments, the bidirectional enhanced feature map may be provided to one or more trained neural network layers and/or a softmax function to determine final object detection information.

In some embodiments, a frame sequence is reversed and object detection in one direction of the video clip is performed and the results are cached (this utilizes the successor video information). Then object detection is performed in the opposite direction for the same video clip (this utilizes the predecessor video information). The cached feature map and the current feature map are concatenated and provided to an election layer, which determines the final detection output. In some embodiments, the election layer is a pretrained layer (e.g., includes one or more neural network layers). In some embodiments, the election layer is predetermined to retain higher confidence scores as discussed.

FIG. 1 illustrates an example device 100 for performing object detection or recognition in video using a bidirectional pairing architecture, arranged in accordance with at least some implementations of the present disclosure. As shown in FIG. 1, device 100 includes any number of still image object detectors 101, 102, 103, 104, any number of similarity detectors 105, 106, 107, any number of concatenation modules 131, 132, 133, 134, and any number of election modules 151, 152, 153, 154. Notably, device 100 may implement any number of such detectors and modules such as one each, two each, etc. and such available detectors and modules may be used in a sequential manner to perform the processing discussed herein. Device 100 may be implemented in any suitable form factor device such as a personal computer, a laptop computer, a tablet, a motor vehicle platform, a robotics platform, a phablet, a smart phone, a digital camera, a gaming console, a wearable device, a display device, an all-in-one device, a two-in-one device, or the like. For example, device 100 may perform object detection as discussed herein. For example, device 100 performs forward object detection to generate forward enhanced feature maps, reverse object detection to generate reverse enhanced feature maps, and final detection using the forward and reverse enhanced feature maps. For example, device 100 may include a memory to store frames of video and a processor to perform the operations discussed herein.

As shown, a sequence of video frames 111, 112, 113, 114 are provided in the following temporal order: F1, F2, F3, ... FN. Video frames 111, 112, 113, 114 may include any suitable video frames, video pictures, sequence of video frames, group of pictures, groups of pictures, video data, or the like in any suitable resolution. For example, the video may be video graphics array (VGA), high definition (HD), Full-HD (e.g., 1080p), 4K resolution video, 5K resolution video, or the like, and the video may include any number of video frames, sequences of video frames, pictures, groups of pictures, or the like. Techniques discussed herein are discussed with respect to frames for the sake of clarity of presentation. However, such frames may be characterized as video pictures.

Figure 2:
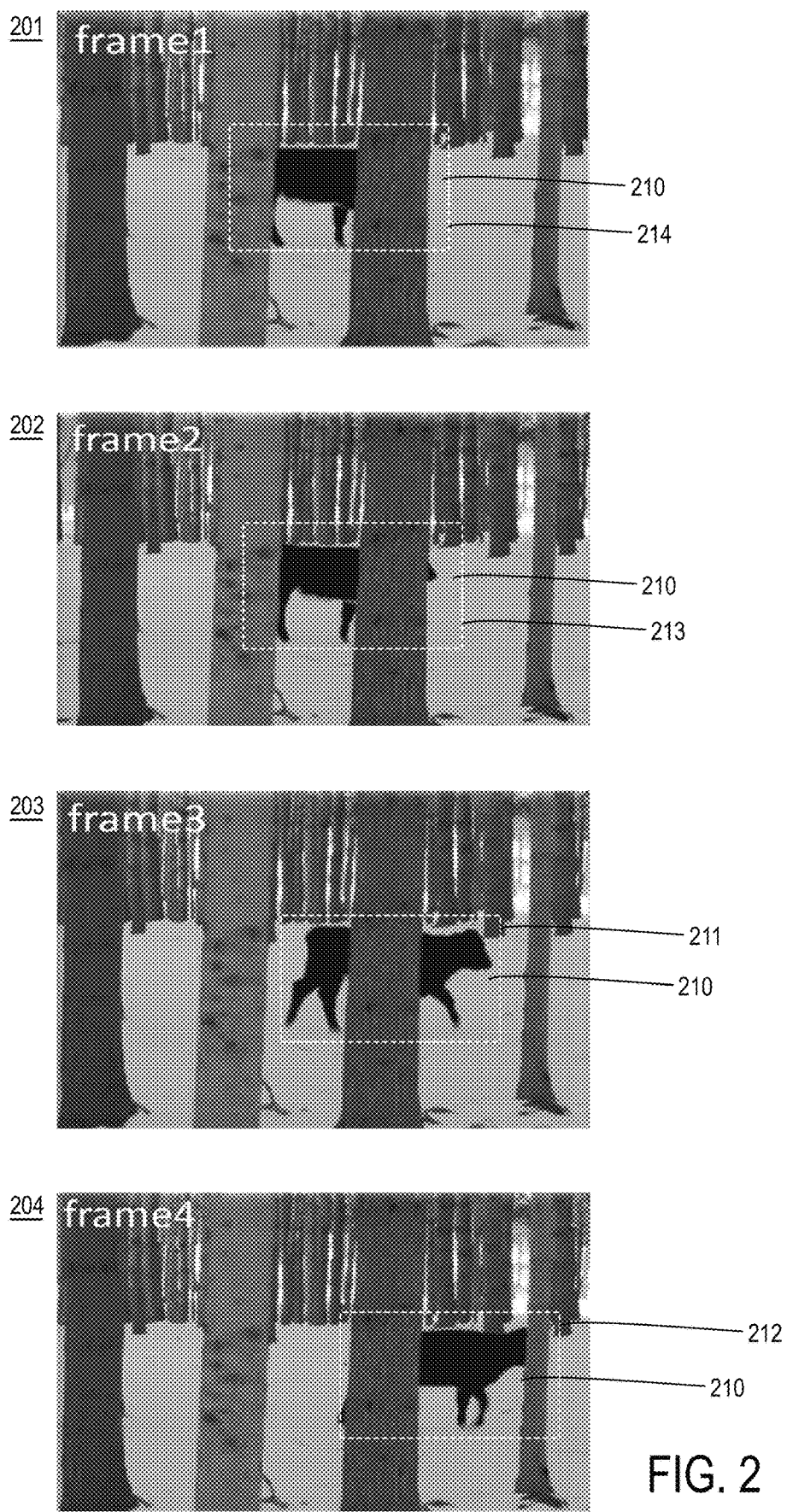
FIG. 2 illustrates example video frames having an object that is partially obscured for detection using device.

FIG. 2 illustrates example video frames having an object that is partially obscured for detection using device 100, arranged in accordance with at least some implementations of the present disclosure. As shown in FIG. 2, frames 201, 202, 203, 204 (also labeled as frame1, frame2, frame 3, frame4) include an object 210 (e.g., an animal) that goes in and out of being obscured by trees of frames 201, 202, 203, 204. Notably, using still image object detection, some of frames 201, 202, 203, 204 may fail in detecting or recognizing object 210 due to it being obscured. Furthermore, processing in the forward direction may detect object 210 in frame 203 and frame 204, but not in frame 201, 202. Or, such forward processing may not detect object 210 at all. The techniques discussed herein use both forward processing (e.g., frames in the order frames 201, 202, 203, 204) and reverse processing (e.g., frames in the order frames 204, 203, 202, 201) to detect object 210 in all frames such that all of frames 201, 202, 203, 204 may be detected as key frames frames having the object) for further processing.

Returning to FIG. 1, as shown, in forward processing 171, frame 111 is processed by still object detector 104 and frame 112 is processed by still object detector 103. Each of still object detector 104 and still object detector 103 generates an initial feature map based on their respective frames. As discussed, each of the feature maps may include a confidence feature map (e.g., indicating what, if anything, has been detected at each location) and a localization feature map indicating where the feature is located. For example, each of the feature maps may include a prediction result for each of thousands of potential object patches within each frame. Such feature map characteristics are discussed further herein with respect to FIG. 4. Also as shown, similarity detector 107 is applied for frames 111, 112 to detect similar patches between frame 111 and frame 112. For similar patches, the preliminary feature map of frame 112 is updated as discussed to generate a forward feature map 126. For example, for corresponding similar patches, the prediction result for frame 112 is updated when the confidence for the detected object in the patch of frame 111 exceeds the confidence for the detected object in the patch of frame 112.

With reference to FIG. 2, an animal is detected in a patch 211 of frame 203 and a similar patch 212 is detected in frame 204 (notably the images within patches 211, 212 differ but have substantial similarities, which may exceed a similarity threshold). In the illustrated example, patch 211 may have a prediction result of "cattle", 0.8 while the prediction result of patch 212 may be "dog", 0.5 or even "background", 0.6. In such examples, the prediction result for patch 212 in the preliminary feature map for frame 204 is updated to "cattle", 0.8 based on the confidence of the prediction result of similar patch 211 in frame 203 exceeding the confidence of the prediction result of similar patch 212 (e.g., 0.8>0.6 so use detection result "cattle"). In some embodiments, an object of any confidence replaces a result of "background". In the illustrative embodiment, a prediction result of "cattle", 0.8 for patch 211 would replace any confidence level of "background".

Returning again to FIG. 1, forward feature map 126 for frame 112 may be cached and saved for later processing. Notably, no detection results may be generated using only forward feature map 126. Furthermore, a forward feature map 128 may be generated for frame 111 although no enhancements using another feature map may be generated (as frame 111 is the first in the forward sequence). Such processing is repeated in a sequential manner for forward processing 171. Enhanced forward feature map 126 is used in the same manner to enhance a preliminary feature map for frame 113 generated by still image object detector 102 based on similar patches detected by similarity detector 106. The resultant enhanced forward feature map is shown as forward feature map 124, which again may be cached for future use. Similar processing is repeated for any number of frames through frame 114 (by still image object detectors including still image object detector 101 and similarity detectors including similarity detector 105) to generate forward feature map 122 (and any number of intervening feature maps), all of which may be cached for later use. Although discussed with respect to forward processing 171 occurring prior to reverse processing 172, the forward and reverse processing may be performed in either order.

In reverse processing 172, frame 114 is processed by still object detector 101 and frame 113 is processed by still object detector 102. As discussed with respect to forward processing 171, each of still object detector 101 and still object detector 102 generates a feature map based on their respective frames. Notably, such still image object detection may only be performed once for each frame with the results being cached (still image object detection does not need to be repeated in forward and reverse processing). Each of the feature maps, as described above, may include a confidence feature map and a localization feature map. Similarity detector 105 is applied to frames 114, 113 to detect similar patches between frame 114 and frame 113 (again such processing may only be performed once with the results being cached). For similar patches, the preliminary feature map of frame 113 is updated to generate a reverse feature map 123. Notably, each of the forward and reverse feature maps may be characterized as enhanced feature maps. As discussed, for corresponding similar patches, the prediction result for frame 113 is updated when the confidence for the detected object in the patch of frame 114 exceeds the confidence for the detected object in the patch of frame 113.

Again with reference to FIG. 2, an animal is detected in a patch 211 of frame 203 and a similar patch 213 is detected in frame 202 (notably the images within patches 211, 213 differ but may have a measured similarity that exceeds a similarity threshold). As discussed above, patch 211 may have a prediction result of "cattle", 0.8. Notably, the prediction result of patch 211 may have been from still image object detection or it may have been carried over from subsequent frames (e.g., frames subsequent to frame 204) due to the similarity and patch prediction result processing discussed herein. Furthermore, the prediction result of patch 213 may again be "dog", 0.4 or even "background", 0.8. In such examples, the prediction result for patch 213 in the preliminary feature map for frame 202 is updated to "cattle", 0.8 based on the confidence of the prediction result of similar patch 211 in frame 203 exceeding the confidence of the prediction result of similar patch 213 (e.g., 0.8)-0.6 so use detection result "cattle"). Similarly, the prediction result of patch 214 may again be updated to "cattle", 0.8 based on the confidence of the prediction result of similar patch 213 in frame 202 exceeding the confidence of the prediction result of similar patch 214. Thereby, a high confidence detection in a subsequent frame is carried over to previous frames (in the reverse processing iteration) to similar patches. Such high confidence detection is also carried forward in the previously discussed forward processing iteration.

With reference to FIG. 1, reverse feature map 123 and forward feature map 124 (as attained from cache) for frame 113 are concatenated by concatenation module 132 to generate concatenated feature maps 142. As used herein, the term in concatenate indicates the reverse feature map 123 and forward feature map 124 are joined without loss of information. In an embodiment, concatenation module 132 concatenates a confidence feature map of reverse feature map 123 and a confidence feature map of forward feature map 124 separately from concatenation of a localization feature map of reverse feature map 123 and a localization feature map of forward feature map 124 to generate two concatenated feature maps: a concatenated confidence feature map and a concatenated localization feature map. In either case, the resultant concatenated feature maps are illustrated as concatenated feature maps 142 corresponding to frame 113. Similarly, reverse feature map 121 and forward feature map 122 (as attained from cache) for frame 114 are concatenated by concatenation module 131 to generate concatenated feature maps 141, reverse feature map 125 and forward feature map 126 (as attained from cache) for frame 112 are concatenated by concatenation module 133 to generate concatenated feature maps 143, reverse feature map 127 and forward feature map 128 (as attained from cache) for frame 111 are concatenated by concatenation module 134 to generate concatenated feature maps 144, and so on to generate concatenated feature maps for any frames of the video sequence.

As shown, each of concatenated feature maps 141, 142, 143, 144 are provided, respectively, to election modules 151, 152, 153, 154. Each of election modules 151, 152, 153, 154 may perform the same processing but any number of such election modules 151, 152, 153, 154 may be implemented by device 100 for parallel processing. For each of concatenated feature maps 141, 142, 143, 144, resultant object detection data 161, 162, 163, 164 are generated. Resultant object detection data 161, 162, 163, 164 may include any suitable data or data structures indicating resultant objects detected in respective ones of frames 114, 113, 112, 111, For example, resultant object detection data 161, 162, 163, 164 may indicate object detection localization (e.g., a bounding box index or bounding box location and size), a class (e.g., an index of one of multiple available object classes: person, building, car, dog, cattle, etc.), and a confidence scoring (e.g., a value between 0 and 1 indicating a confidence in the class) for one or more detected objects.

Resultant object detection data 161, 162, 163, 164 may be generated using concatenated feature maps 141, 142, 143, 144 using any suitable technique or techniques. In an embodiment, concatenated feature maps 141, 142, 143, 144 are provided to and processed by one or more neural network layers to generate resultant object detection data 161, 162, 163, 164. For example, the neural network layer(s) may be pretrained as discussed further herein to generate resultant object detection data 161, 162, 163, 164 based on concatenated feature maps 141, 142, 143, 144.

In another embodiment, shared object patches are determined between the reverse feature maps and forward feature maps as provided by concatenated feature maps 141, 142, 143, 144. For each shared object patch (as identified by shared object patch or bounding box indices), the prediction result having the higher confidence is used to generate object detection data 161, 162, 163, 164 while the lower prediction result is discarded. For example, if a shared object patch has a prediction result of "dog", 0.8 in the forward feature map and a prediction result of "car", 0.4 in the reverse feature map, the prediction result of "dog", 0.8 is used while the prediction result of "car", 0.4 is discarded. The retained prediction results for all of the available object patches are then used to generate object detection data 161, 162, 163, 164. For example, each object patch having a confidence score above a threshold may be reported in object detection data 161, 162, 163, 164, only a top particular number (e.g., one, three, five, etc.) of top scoring object patches may be reported, etc.

In some embodiments, a shared object patch between first and second enhanced feature maps are determined. As used herein, a shared object patch indicates two patches that have the same or similar localization information. Then, object detection localization and confidence scoring are retained from the feature map for the shared object patch (and the lower scoring prediction results are discarded) in response to the object detection confidence scoring for the shared object patch comparing favorably to the other object detection confidence scoring. In some embodiments, object detection localization and confidence scoring for shared object patches between first and second feature maps are retained based on higher confidence scoring for each of the shared object patches to generate a bidirectional enhanced feature map for the current frame. The bidirectional enhanced feature map may then be used to determine final object detection data. In an embodiment, a softmax function is applied to the bidirectional enhanced feature map to determine final object detection data. In an embodiment, a pretrained neural network layer or layers is applied to the bidirectional enhanced feature map to determine final object detection data.

Object detection data 161, 162, 163, 164 may include any suitable data such as object detection localization, class, and confidence scoring. As discussed, reverse or forward processing is completed for a video sequence prior to the opposite direction processing being completed. With reference to FIG. 1, in some embodiments, prior to modifying an initial feature map for any frame N–x, enhanced feature maps including forward object detection localization and confidence scoring (e.g., in a temporal order of the video or opposite the temporal order), are generate for all frames 1 through N–1–x. Thereby, for frame N–x, frame N–1–x has been enhanced prior to frame N–x processing. Furthermore, enhanced feature maps including forward object detection localization and confidence scoring may be generated for all subsequent frames N–x+1 though N prior to opposite direction processing. Thereby, all first direction processing is finished prior to any second direction processing beginning. Each enhanced feature map from the first direction processing is the cached prior to any second direction processing beginning. The second direction processing is then performed in a similar sequential manner. As each second direction enhanced feature map is generated, it may be paired with its first direction feature map partner and used to generate final output object detection data.

Figure 3:
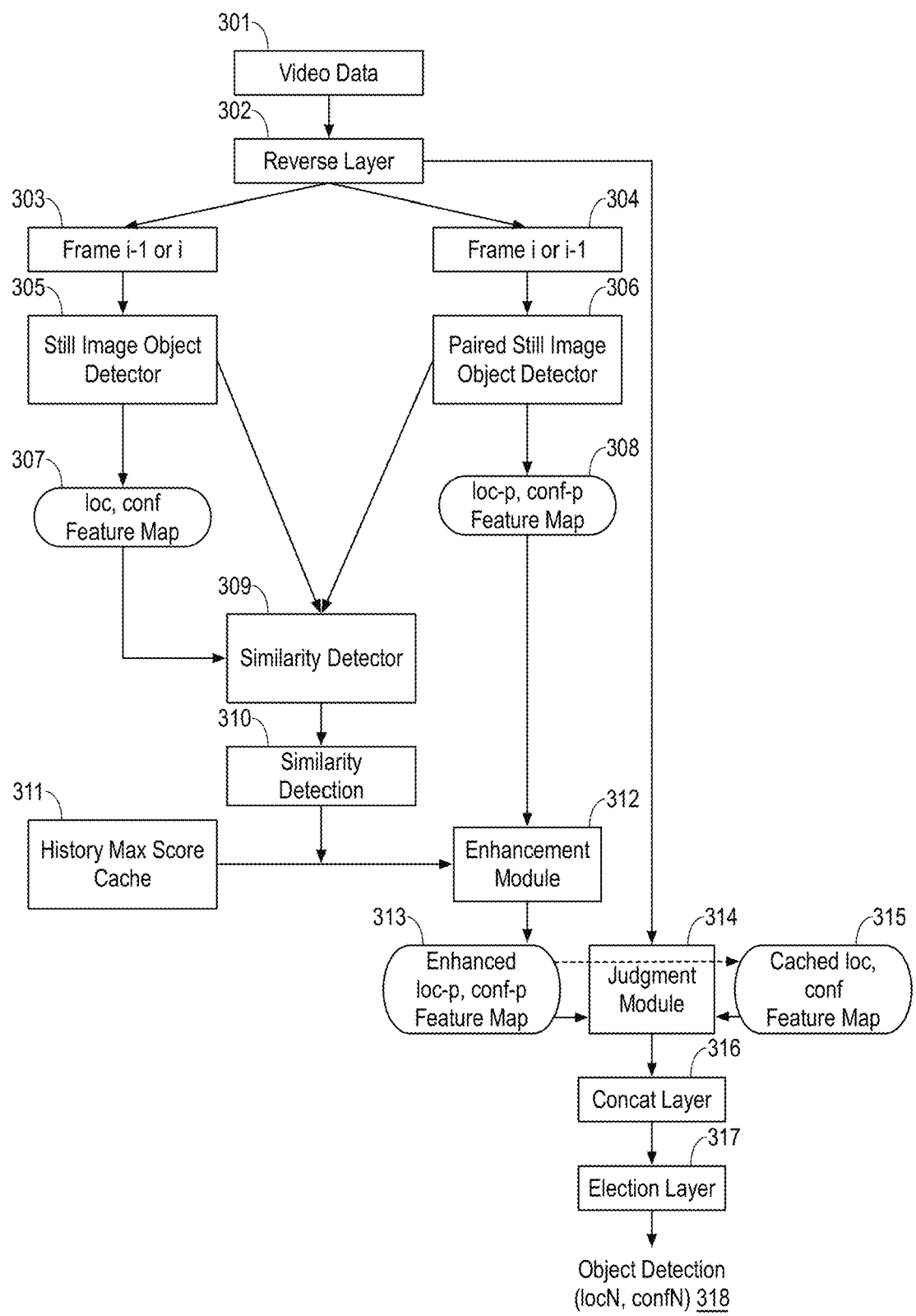
FIG. 3 illustrates an example bidirectional pairing architecture inference network for performing object detection or recognition in video.

FIG. 3 illustrates an example bidirectional pairing architecture inference network 300 for performing object detection or recognition in video, arranged in accordance with at least some implementations of the present disclosure. For example, network 300 may be implemented as any combination of two still object detectors, a shared similarity detector, a concatenation module, and an election module, as shown in FIG. 1. The modules and components discussed with respect to FIG. 3 may supplement those modules and components discussed with respect FIG. 1. Network 300 may be implemented in device 100 or any other device or system discussed herein.

As shown, network 300 receives video data 301 including a sequence of frames such as frames 111, 112, 113, 114 or any other frames discussed herein. For example, video data 301 may be a video stream of frames received from an imaging device (not shown). As shown, the frames of video data 301 may be reversed at reverse layer 302 such that processing is performed first in a first direction (e.g., forward) and subsequently in a second direction opposite the first direction. As shown, a pair of frames are established as pair of frames 303, 304 from video data 301 such that pair of frames 303, 304 are consecutive frames of video data 301 in either a temporal order or an order opposite the temporal order (e.g., pair of frames 303, 304 may be a current frame, i–1, and a subsequent frame, i, or a previous frame, i–1, and a current frame, i).

Network 300 includes a pair of still image object detectors including a still image object detector 305 and a paired still image object detector 306. As shown, still image object detector 305 may receive frame i-I and paired still image object detector 306 may receive frame i (in a forward processing mode) or still image object detector 305 may receive frame i and paired still image object detector 306 may receive frame i–1 (in a reverse processing mode). Still image object detectors 305, 306 may be any suitable still image object detectors such as region proposal network (faster R-CNN) detectors, region-based fully convolutional network (R-FCN) detectors, single-shot multibox (SSD) detectors, or you only look once (YOLO) detectors. Still image object detector 305, 306 may be any pair of still object detectors illustrated in FIG. 1 after the training described in further detail herein.

As shown, still image object detectors 305, 306 generate feature maps 307, 308, respectively. As discussed, feature map 307 may include one or two (or more) feature maps indicating localization information (loc) and confidence information or scores (conf) for the frame provided to still image object detector 305. Similarly, feature map 308 may include one or two (or more) feature maps indicating localization information (loc-p) and confidence information or scores (conf-p) for paired frame 304 provided to paired still image object detector 306. For example, the localization information may include predicted bounding box coordinates $(x_{min}, y_{min})$ and $(x_{max}, y_{max})$ or a predicted bounding box index (which may be used to access the coordinates and/or bounding box size). The confidence scores may indicate a level of confidence that a bounding box is associated with one or more particular object categories. For example, the bounding box as indicated by the localization information may be a default prior bounding box for one-stage object detector (e.g., SSD, YOLO) or a posterior calculated bounding box for two-stage object detector (e.g., RFCN). In some embodiments, the confidence scores may be any number of confidence scores associated with a number of possible object types or classifications. For example, given the possible classifications of "cat," "dog," "car," and "background," the confidence information may be: (cat_score, dog_score, car_score, background_score), where cat_score, dog_score, car_score, and background_ score are confidence scores for each of the possible classifications.

Network 300 also includes a similarity detector 309 communicatively coupled to still image object detectors 305, 306. Similarity detector 309 may be any suitable similarity detector to detect similar patches between pair of frames 303, 304. In an embodiment, similarity detector 309 is a Siamese-CNN (convolutional neural network). Similarity detector 309 may be any similarity detector illustrated in FIG. 1 after the training described in further detail herein. Similarity detector 309 generates similarity detection 310, which may include any data or data structures indicating similar patches between frame 303 and paired frame 304. For example, similarity detection 310 may provide pairings of patch indices between patches of frames 303, 304 that match (e.g., patch index 0301 of frame 303 matches of patch index 2843 of frame).

Network 300 further includes a history max score cache 311 communicatively coupled to an enhancement module 220, which is also communicatively coupled to similarity detector 309 to receive the similarity detection 310. History max score cache 311 includes a history of maximum confidence scores for bounding boxes being evaluated. Enhancement module 312 generates an enhanced feature map 312 for frame 304 using similarity detection 310, feature map 307, feature map 308, and history max score cache 311 data. As discussed with respect to feature maps, 307, 308, feature map 313 may include one or two (or more) feature maps indicating localization information (loc-p) and confidence information or scores (conf-p) for frame 304 after feature map 308 is enhanced as discussed herein.

For example, similarity detector 309 detects paired object patches in frames 303, 304 based on a detected similarity between the paired objects. For example, similarity detector 309 may be trained using a contrastive loss based on Euclidean distance as described herein below to compare bounding boxes between frames 303, 304 to determine their similarity. In some embodiments, if two paired bounding boxes demonstrate similarity above a predetermined threshold (e.g., 0.5), then an indicator in similarity detection 310 is generated for the paired bounding boxes or patches. Enhancement module 312 can modify the prediction result within feature map 308 for frame 304 using the prediction result for the similar patch in frame 303 (as stored in history max score cache 311) as discussed herein. For example, if the similar patch in frame 303 has a higher confidence score, the prediction result for the patch in frame 304 is modified to the higher confidence score and classification.

For example, enhancement module 312 can generate an enhanced confidence score for feature map 308 for each detected paired patch as indicated by similarity detection 310 in frame 304. Based on the localization information and the confidence scores in feature map 307, the confidence score for the similar patch in frame 303 is retrieved and compared with the confidence score of the patch in frame 304. When the confidence score in feature map 307 is greater than the confidence score in feature map 308, the confidence score and classification for the localization information of the patch is updated to generate enhanced feature map 313.

For example, if history max score cache 311 includes a prediction result with a greater confidence value for a similar patch (a max in the history) of any given patch, then the prediction result may be changed to the prediction result in history max score cache 311 (by changing the confidence score and classification but not the localization information). For example, history max score cache 311 can store the enhanced confidence score and localization information for each patch as frames are processed. Therefore, feature map 313 includes maximum available confidence scores for each patch from feature map 308 and history max score cache 311.

As shown, network 300 includes a judgment module 314. If there is not any output from a reverse layer, judgment module 314 only selects feature map 313 for later utilization and feature map 313 is cached for later use in feature map cache 315. The discussed processing is then repeated for any number of frames in the forward direction. Subsequently, the discussed processing is repeated in the reverse direction to generate a feature map in analogy to feature map 313 (e.g., feature map 313 is a forward enhanced feature map and the subsequent feature map is a reverse enhanced feature map). Then, judgment module 314 selects the current enhanced feature map (e.g., reverse) and the previously cached enhanced feature map (e.g., forward) via feature map cache 315 and provides them to concatenation layer 316 for processing.

Concatenation layer 316 may be implemented via any of concatenation modules 131, 132, 133, 134 illustrated in FIG. 1 after the training described in further detail herein. Concatenation layer 316 concatenates the enhanced feature maps and provides them to election layer 317. Election layer 317 may be implemented via any of election modules 151, 152, 153, 154 illustrated in FIG. 1 after the training described in further detail herein. Election layer 317 generates resultant object detection data 318 using the concatenated feature maps. Resultant object detection data 318 may include any suitable data or data structures indicating resultant object detection. In some embodiments, election layer 317 applies one or more pretrained neural network layers to the concatenated feature maps to generate object detection data 318. In some embodiments, election layer 317 provides maximum confidence value prediction results for shared object patches between the concatenated feature maps.

As discussed, feature maps may be generated for an input frame using a still object detector and the resultant feature maps may be enhanced using previous frame information (in a first direction of processing) and using subsequent frame information (in a second direction of processing opposite the first direction). The enhanced feature maps may then be concatenated and processed to determine resultant object detection data.

Figure 4:
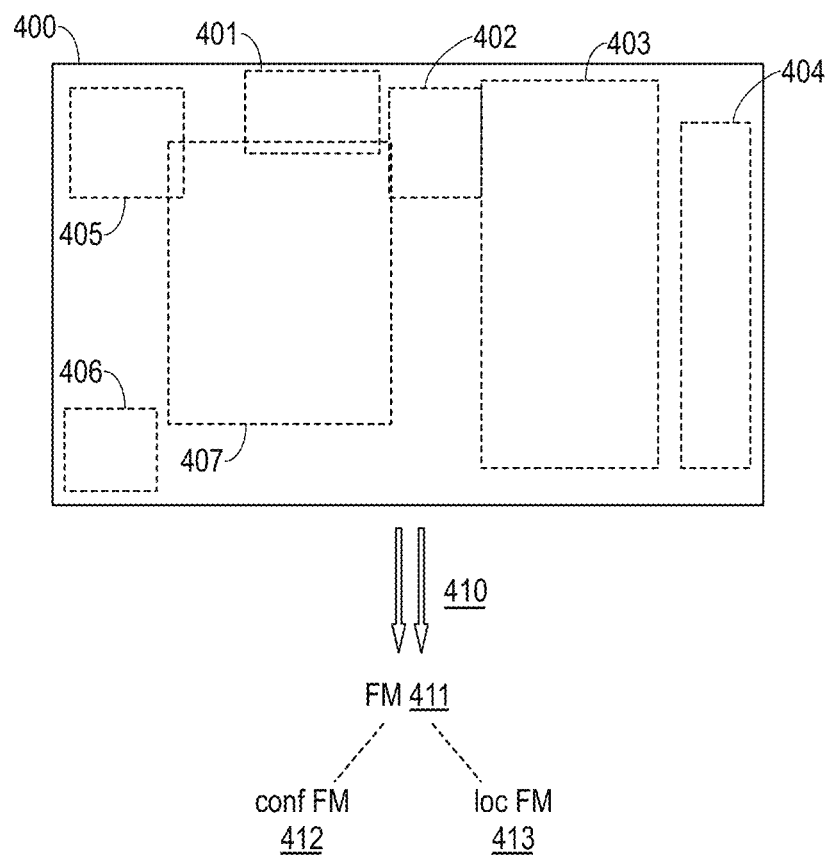
FIG. 4 illustrates example bounding boxes or patches of an example frame.

FIG. 4 illustrates example bounding boxes or patches of an example frame 400, arranged in accordance with at least some implementations of the present disclosure. For frame 400, any number of candidate or default bounding boxes may be established, a small number of which are illustrated with respect to bounding boxes 401-407. Notably, for each of the candidate bounding boxes (e.g., thousands of candidate bounding boxes), localization information and confidence information are generated using still image object detection and enhanced as discussed herein. Such processing is generally illustrated by operation 410. As shown, feature map 411 may include a confidence feature map 412 and a localization feature map 413. As discussed herein, localization feature map 413 may indicate localization information for the candidate bounding boxes and confidence feature map 412 indicates object detection classification and scoring for the candidate bounding boxes.

Furthermore, as discussed with respect to enhancement module 312, for bounding boxes of a current frame, prediction results may be enhanced using patch similarity techniques and/or history max score techniques.

Figure 5:
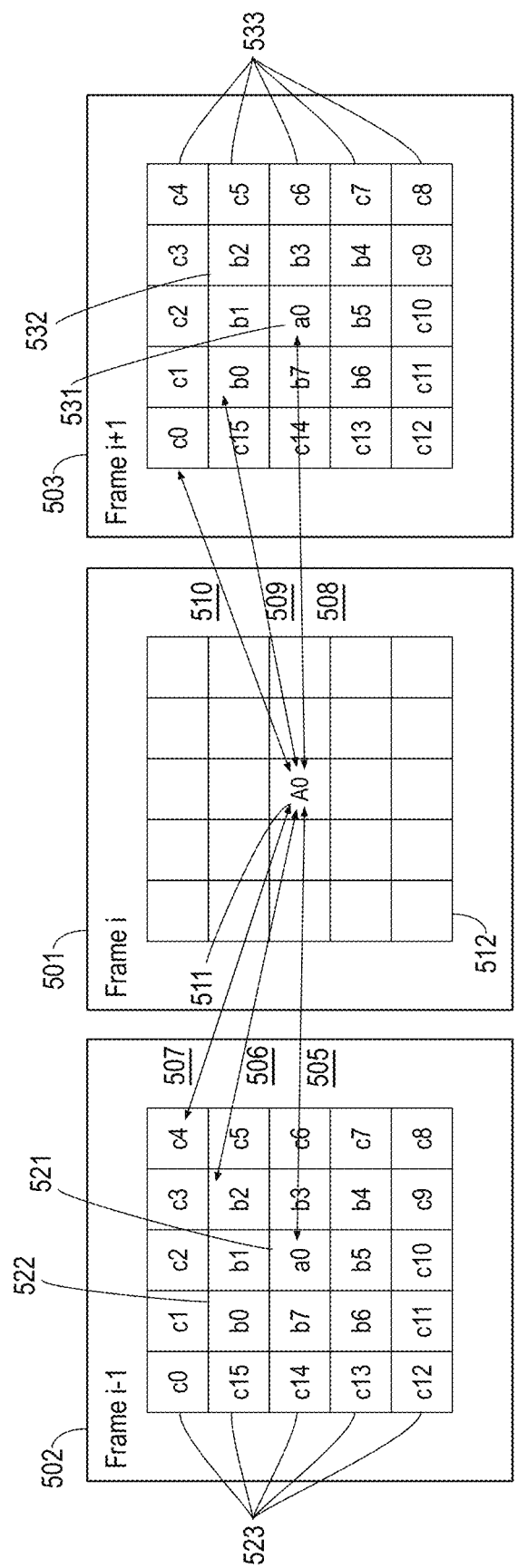
FIG. 5 is a diagram of exemplary local searching pairing for adjacent frames to a current frame.

FIG. 5 is a diagram of exemplary local searching pairing for adjacent frames to a current frame, arranged in accordance with at least some implementations of the present disclosure. As shown, for a current frame 501, the frame may be paired to a previous frame 502 during forward processing and to a subsequent frame 503 during reverse processing. Current frame 501 includes a default bounding box 511 and additional bounding boxes 512 (all lose not labeled A0). Previous frame 502 includes a default bounding box 521 in the same position as default bounding box 511 of current frame 501 (e.g., they are collocated). Previous frame 502 also includes a second set of default bounding boxes 522 that border bounding box 521. Previous frame 502 further includes a third set of default bounding boxes 523 that border second set of default bounding boxes 522. Arrows 505, 506, 507 indicate a pairing of default bounding box 511 with default bounding box 521 second set of default bounding boxes 522, and third set of default bounding boxes 523, respectively.

As shown, in forward processing, default bounding boxes that infer the highest confidence scores for confidence information in current frame may be determined. For default bounding box 511, it may be paired with default bounding boxes including default bounding boxes 521, 522, 523. For example, default bounding box 511 may be paired with 9 or more default bounding boxes in previous frame 502 including the default bounding box 521 and the second set of default bounding boxes 522. In some embodiments, default bounding box 511 can be paired with 25 bounding boxes in previous frame 502 including the default bounding box 521, second set of default bounding boxes 522, and third set of default bounding boxes 523. The resulting pairs may include (A0, a0), (A0, b0), (A0, b1), . . . (A0, b7), (A0, c0), (A0, c1), (A0, c15). The sets of pairs can be used by a similarity module to compare and track the same object patch, as described in greater detail herein.

Figure 6:
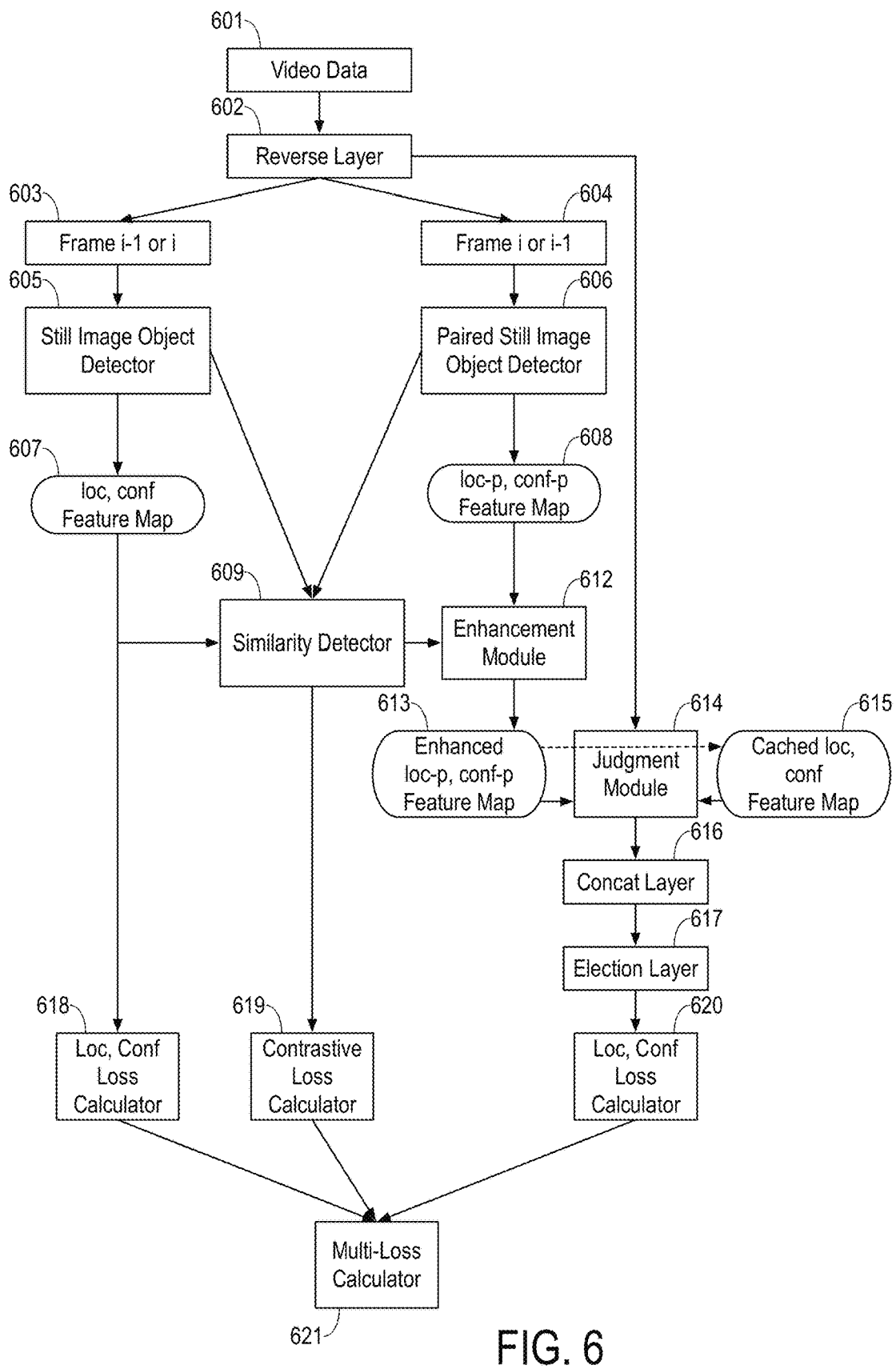
FIG. 6 illustrates an example bidirectional palling architecture training network for performing object detection or recognition in video.

Similarly, in reverse processing, default bounding boxes that infer the highest confidence scores for confidence information in current frame may again be determined. For default bounding box 511, it may be paired with default bounding boxes including default bounding boxes 531, 532, 533, For example, default bounding box 511 may be paired with 9, 25, or more default bounding boxes in subsequent frame 503 (as shown via arrows 508, 509, 510) including a default bounding box 531, a second set of default bounding boxes 532 and/or a third set of default bounding boxes 533. The sets of pairs again can be used by a similarity module to compare and track the same object patch FIG. 6 illustrates an example bidirectional pairing architecture training network 600 for performing object detection or recognition in video, arranged in accordance with at least some implementations of the present disclosure. For example, training network 300 may be used to pretrain network 300 for implementation in device 100. As used herein, the term true positives (TP) indicates positive samples correctly labeled by the classifier, the term true negatives (TN) indicates negative samples that were correctly labeled by the classifier, false positives (FP) indicate negative samples that were incorrectly labeled as positive, and false negatives (FN) indicate positive samples that were mislabeled as negative.

As shown, training network 300 receives video data 601 including multiple sequence of frames in analogy to frames 111, 112, 113, 114. For example, video data 601 may include multiple video streams of frames received as a training corpus to provide pretraining of system for object detection or recognition in video. For example, video data 601 may be training data including one or more objects within frames such that the objects are at least partially occluded.

As shown, the frames of video data 601 may be reversed at reverse layer 602 such that processing is performed first in a first direction (e.g., forward) and subsequently in a second direction opposite the first direction. As shown, a pair of frames are established as pair of frames 603, 604 from video data 601 such that pair of frames 603, 604 are consecutive frames of a sequence of video data 601 in either a temporal order or an order opposite the temporal order (e.g., pair of frames 603, 604 may be a current frame, i−1, and a subsequent frame, i, or a previous frame, i−1, and a current frame, i).

Training network 300 includes a pair of still image object detectors including a still image object detector 605 and a paired still image object detector 606. As shown, still image object detector 605 receives frame i−1 and paired still image object detector 606 receives frame i (in a forward processing mode) or still image object detector 305 receives frame i and paired still image object detector 306 receives frame i−1 (in a reverse processing mode). Still image object detectors 305, 306 may be any suitable still image object detectors such as region proposal network (faster R-CNN) detectors, region-based fully convolutional network (R-FCN) detectors, single-shot multibox (SSD) detectors, or you only look once (YOLO) detectors. Still image object detector 305, 306 may be any pair of still object detectors illustrated in FIG. 1 after the training described in further detail herein.

As shown, still image object detectors 605, 606 generate feature maps 607, 608, respectively. As discussed, feature map 607 may include one or two (or more) feature maps indicating localization information (loc) and confidence information or scores (conf) for the frame provided to still image object detector 605. Similarly, feature map 608 may include one or two (or more) feature maps indicating localization information (loc-p) and confidence information or scores (conf-p) for paired frame 604 provided to paired still image object detector 606.

Training network 300 further includes a similarity detector 609, which may be any suitable similarity detector to detect similar patches between pair of frames 603, 604. In an embodiment, similarity detector 609 is a Siamese-CNN. Similarity detector 609 determines similar patches between frame 603 and paired frame 604. Training network 300 further includes an enhancement module 312, which generates an enhanced feature map 612 for frame 604 using detected similarity, feature map 607, and feature map 608. For example, detected paired object patches (based on a detected similarity) between frames 603, 604 may be trained using similarity detector 609 based on a contrastive loss based on Euclidean distance. Enhancement module 612 can then modify the prediction result within feature map 608 for frame 604 using the prediction result for the similar patch in frame 603 as discussed herein. Enhancement module 612 may also modify a prediction result within feature map 608 using a history max score cache as discussed herein.

If there is not any output from a reverse layer, a judgment module 614 selects feature map 613 for later utilization and feature map 613 is cached for later use. The discussed processing is then repeated for any number of frames in the forward direction. Subsequently, the discussed processing is repeated in the reverse direction to generate feature maps in analogy to feature map 613 for the reverse direction. Judgment module 614 then selects the current enhanced feature map (e.g., reverse) and the previously cached enhanced feature map (e.g., forward) and provides them to concatenation layer 616. Concatenation layer 616 concatenates the enhanced feature maps and provides them to election layer 617, which generates resultant object detection data by applying one or more pretrained neural network layers to the concatenated feature maps or providing maximum confidence value prediction results for shared object patches between the concatenated feature maps.

Training network 300 includes a localization (loc) and confidence (conf) loss calculator 618, a contrastive loss calculator 619, and a localization (loc) and confidence (conf) loss calculator 620. Training network 300 further includes a multi-loss calculator 621 coupled to localization and confidence loss calculator 618, contrastive loss calculator 619, and localization and confidence loss calculator 620. The training objective of training network 300 may be to minimize the sum of a similarity loss between two object patches (contrastive loss), the localization loss for object bounding box detection (loc loss), and the confidence loss for object classification (conf loss). In some embodiments, before training is performed, default bounding boxes corresponding to a ground truth detection may first be determined or established. As used herein, a default bounding box indicates a kind of patch proposal policy used to determine a detection region for an object (e.g., proposed regions for detection). Default bounding boxes may also be referred to as default boxes, prior boxes, or anchor boxes. In some embodiments, a default bounding box having a higher Jaccard overlap with the ground truth bounding boxes may be referred to as a positive default bounding box. A ground truth bounding box is a bounding box labeled with known true information in the dataset. For example, positive default bounding boxes may have a Jaccard overlap with the ground truth bounding box that is more than a predetermined threshold (e.g., 0.5). Otherwise, the default bounding box is negative. The Jaccard overlap J may be calculated using Equation (1):

$$J(S_{box1}, S_{box2}) = \frac{S_{box1} \cap S_{box2}}{S_{box1} \cup S_{box2}} \quad \text{Equation (1)}$$

where S is the area of each respective bounding box, and box 1 is the default bounding box and box2 is the ground truth bounding box. Ground truth bounding boxes, as used herein, refer to a label of a bounding box in the dataset, and may also be referred to as the ground truth box. Thus, negative default bounding boxes may have a Jaccard overlap with ground truth bounding box that is less than the predetermined threshold.

In an embodiment, the training objective can be based on the training of SSD networks. For example, $x^p_{ij}=\{1, 0\}$ and $y^p_{ij}=\{1, 0\}$ may be indicators for matching the i-th default bounding box to the j-th ground truth bounding box of category p in the previous and reference frame. Given predicted boxes in the previous and reference frame of $l_{f-1}$ and $l_f$, and ground truth bounding boxes in the previous and reference frame of $g_{f-1}$ and $g_f$; and corresponding default bounding boxes in the previous and reference frame of $d_{f-1}$ and $d_f$, then the overall objective loss function L can be calculated by the multi-loss calculator 621 as a weighted sum of the localization loss (loc loss), the contrastive loss (contra loss) and the confidence loss (conf loss) using Equation (2):

$$L(x, y, c, e, l_{f-1}, l_f, g_{f-1}, g_f, d_{f-1}, d_f) = \quad \text{Equation (2)}$$
$$(L_{conf}(x, c) + \alpha * L_{loc}(x, l_f - 1, g_{f-1})) +$$
$$\frac{1}{N}(L_{conf}(y, e) + \alpha * L_{loc}(y, l_f, g_f)) + \frac{1}{\theta MN}\beta * L_{contra}(d_{f-1}, d_f)$$

where NI and N are the numbers of matched default boxes in the previous and reference frame. If M=0 and N !=0, then the trainer may only consider $L_{conf}$ and $L_{loc}$ for the reference frame. If N=0 and M !=0, then the trainer may only consider $L_{conf}$ and $L_{loc}$ for the previous frame. If M=0 and N=0, then the trainer may set the overall loss to 0. In some examples, the localization loss can be a smooth L1 loss between the predicted box (l) and the ground truth bounding box (g) parameters.

In some examples, since $L_{loc}(x, lf-1, gf-1)$ and $L_{loc}(y, lf, gf)$) are the same formula, while $L_{conf}(x, c)$ and $L_{conf}(y, e)$ are also the same formula, $L_{loc}(x, l, g)$ can be calculated using Equation (3):

$$L_{loc}(x, l, g) = \sum_{i \in Pos}^{N} \sum_{m \in \{cx,cy,w,h\}} x^k_{ij} smooth_{L1}(l^m_i - \hat{g}^m_j) + \underset{i \in Neg}{0} \quad \text{Equation (3)}$$

-continued
$$\hat{g}^{cx}_j = (g^{cx}_j - d^{cx}_i)/d^w_i$$
$$\hat{g}^{cy}_j = (g^{cy}_j - d^{cy}_i)/d^h_i$$
$$\hat{g}^w_j = \log(g^w_j/d^w_i)$$
$$\hat{g}^h_j = \log(g^h_j/d^h_i)$$

Similarly, $L_{conf}(x, c)$ can be calculated using Equation (4):

$$L_{conf}(x, c) = -\sum_{i \in Pos}^{N} x^p_{ij}\log(\hat{c}^p_i) - \sum_{i \in Neg}^{N} \log(\hat{c}^0_i) \quad \text{Equation (4)}$$

where $$(\hat{c}^p_i) = \frac{\exp(c^p_i)}{\sum_p \exp(c^p_i)}$$

The contrastive loss is the loss of the corresponding default bounding boxes between two adjacent frames, and can be calculated using Equation (5):

$$L_{contra}(d_{f-1}, d_f) = \sum_{n=1}^{\theta MN}\left(YD^2 + (1 - Y)\max(threshold - D, 0)^2\right) \quad \text{Equation (5)}$$

where $D=\|d_{f-1}-d_f\|_2$, which is the Euclidean distance of default bounding boxes between two adjacent frames, Y is the label whether two boxes are paired or not, threshold is the threshold of two boxes which are unpaired, and θ is the proportion of paired boxes and unpaired boxes. The weight terms α and β can be used to perform cross validation.

As discussed, after pretraining, components of training network 300 are implemented as components of network 300.

Figure 7:
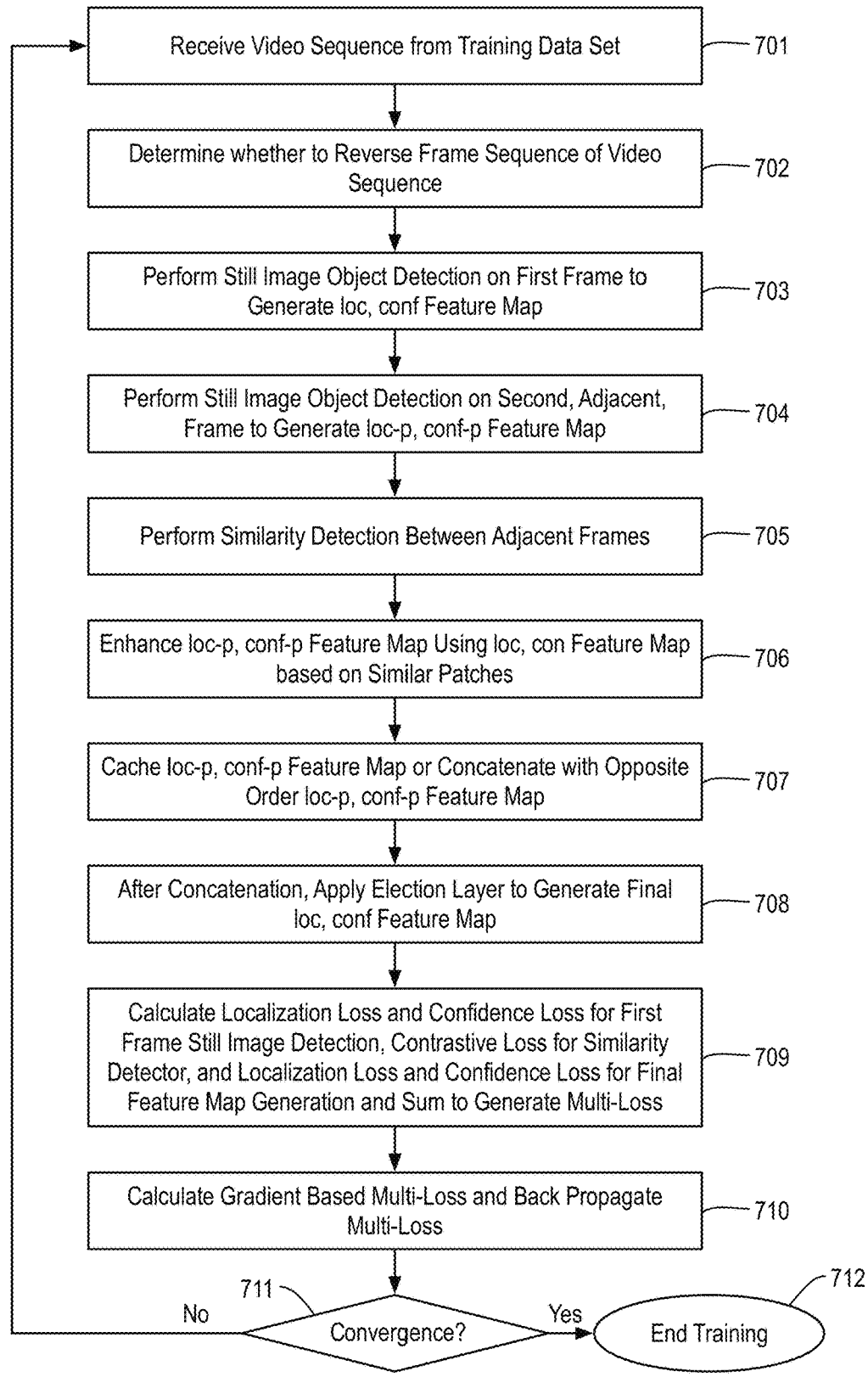
FIG. 7 is a flow chart illustrating a process for training a bidirectional pairing architecture to perform object detection or recognition in video neural network to detect objects in video frames.

FIG. 7 is a flow chart illustrating a process 700 for training a bidirectional pairing architecture to perform object detection or recognition in video neural network to detect objects in video frames, arranged in accordance with at least some implementations of the present disclosure. For example, process 700 may be performed by training network 300 or any other system or device discussed herein.

Process 700 begins at operation 701, where a video sequence from a training data set is received. For example, the video sequence may include various objects in which some are partially obscured. Processing continues at operation 702, where a determination is made as to whether to reverse the frames of the video sequence. For example, operations 703-706 may be performed for the sequence in a first order and then performed in a second order opposite the first order. At operation 707, when the first order processing is complete, the resultant feature maps are cached and, when the second order processing is complete, the resultant feature maps are concatenated with the first resultant feature maps for each frame.

Processing continues at operation 703 where, in either the first or second order, still image object detection is performed on a first frame of the video frames to generate a feature map including a localization feature map and a confidence feature map and at operation 704 where still image object detection is performed on a next (second) frame of the video frames (in the selected order) to generate a paired feature map including a localization feature map and a confidence feature map.

Processing continues at operation 705 where similarity detection is performed between the first and second frames to generate similarity detection data indicative of similar patches between the first and second frames. Processing continues at operation 706 where the feature map for the second frame is enhanced using the feature map for the first fame based on the similar patches. For example, any patches in the second frame having confidence values less than their respective patches in the first frame have their prediction results updated based on the prediction result of the paired patch in the first frame.

As discussed, at operation 707, after processing in the first direction, the enhanced feature map for the frame is cached. Furthermore, operations 703-706 are performed for each pairing of frames sequentially in the first order to generate an enhanced feature map for each frame, which may be characterized as forward enhanced feature maps. Subsequently, the order of the frames is reversed and such processing is repeated in the second direction, opposite the first direction, to generate a second enhanced feature map for each frame, which may be characterized as reverse enhanced feature maps. After such opposite direction processing, operation 707 is used to concatenate, for each frame, the forward enhanced feature map and the reverse enhanced feature map to determine a concatenated feature map for each frame.

Processing continues at operation 708, where the concatenated feature map for each frame is provided to an election layer to generate a final feature map and/or final object detection result data. As discussed, the election layer may be one or more neural network layers or the election layer may determine, for each shared patch of the concatenated feature map, a higher scoring prediction result, retain the higher scoring prediction result, and discard the lower scoring prediction result.

Processing continues at operation 709, where the localization loss and confidence loss for the first frame still image detection, contrastive loss for the similarity detector, and the localization loss and confidence loss for final feature map generation (e.g., from operation 708) are determined and summed to generate a multi-loss measure for the discussed implementation. In some embodiments, the localization loss and confidence loss determinations include matching default bounding boxes to ground truth bounding boxes to generate positive default bounding boxes and negative default bounding boxes, determining a class confidence score for each positive default bounding box and a background confidence score for each negative default bounding box, and determining a localization gap between the positive default bounding boxes and the ground truth bounding boxes.

Processing continues at operation 710, where a gradient is determined based on the multi-loss measurement and used to backward propagate the multi-loss measurement. For example, the gradient may be calculated using partial derivatives with respect to each of the parameters of the multi-loss function. In some examples, the gradient based on the multi-loss measurement is propagated backwards through the entire training network or architecture, including the similarity detector, still image object detectors, and the election layer.

Processing continues at decision operation 711, where a determination is made as to whether a convergence is detected. If so, process 700 ends at end operation 712. If not, processing continues at operation 701 where another sequence of video frames for training is received and processing continues as discussed until convergence is met.

The convergence decision may be based on the multi-loss measurement meeting a threshold, a maximum number of iterations being reached, etc.

Figure 8:
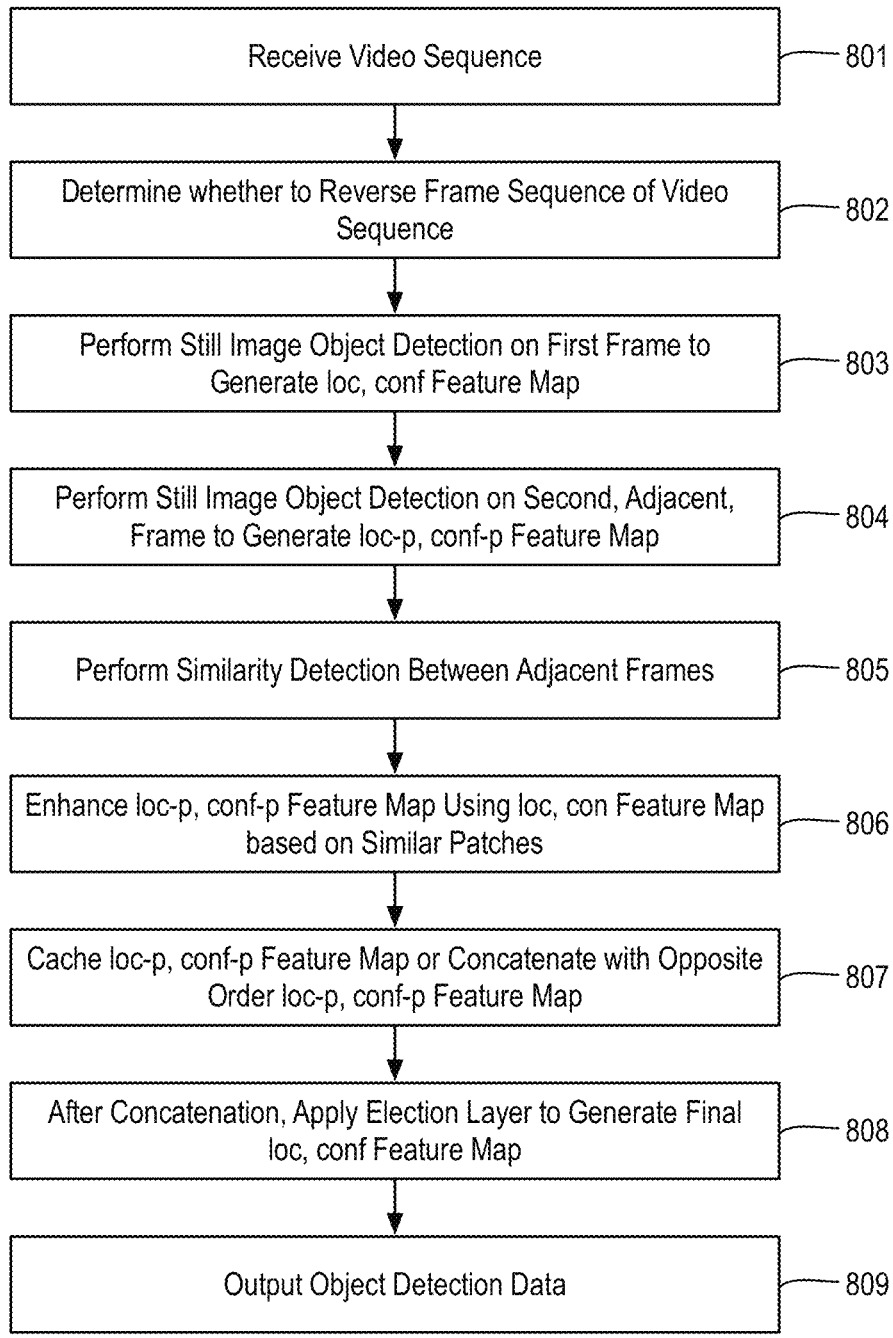
FIG. 8 is a flow chart illustrating a process for performing object detection or recognition in video using a bidirectional pairing architecture.

FIG. 8 is a flow chart illustrating a process 800 for performing object detection or recognition in video using a bidirectional pairing architecture, arranged in accordance with at least some implementations of the present disclosure. For example, process 700 may be performed by network 300, device 100, or any other system or device discussed herein.

Process 800 begins at operation 801, where a video sequence is received. The video sequence may include any number of frames and may be received from a video camera, a memory, another device, or any other suitable component or device. Processing continues at operation 802, where a determination is made as to whether to reverse the frames of the video sequence. For example, operations 803-806 may be performed for the sequence in a first order and then performed in a second order opposite the first order. At operation 807, when the first order processing is complete, the resultant feature maps are cached and, when the second order processing is complete, the resultant feature maps are concatenated with the first resultant feature maps for each frame.

Processing continues at operation 803 where, in either the first or second order, still image object detection is performed on a first frame of the video frames to generate a feature map including a localization feature map and a confidence feature map and at operation 804 where still image object detection is performed on a next (second) frame of the video frames (in the selected order) to generate a paired feature map including a localization feature map and a confidence feature map. As with operations 703, 704, the still image object detectors may generate potential object patches and perform object detection for the object patches. For example, the still image object detectors may perform a patch proposal to generate patches (or candidate bounding boxes). The method used for patch proposal may be based on the type of still image object detector used, including SSD, YOLO, Faster R-CNN, or R-FCN, among other possible still image object detectors. In some embodiments, the prior proposal method may include generating a fixed number and position of patches such as 8,732 patch proposals for each frame with the patches covering different areas, different aspect ratios, and different scale sizes. In some embodiments, a posterior proposal method may be used with a two-stage object detector, such as an R-FCN detector. The posterior proposal method may generate new patches for each sample first, and then perform confidence prediction based on new patches and similarity detection based on new paired patches. For example, a selective search algorithm can be utilized to perform patch proposal for a two-stage object detector such that the selective search algorithm generates object localization hypotheses by picture content that are used to generate posterior proposal patches, which are then used for object detection prediction.

Processing continues at operation 805 where similarity detection is performed between the first and second frames to generate similarity detection data indicative of similar patches between the first and second frames. Processing continues at operation 806 where the feature map for the second frame is enhanced using the feature map for the first fame based on the similar patches. For example, any patches in the second frame having confidence values less than their respective patches in the first frame have their prediction results updated based on the prediction result of the paired patch in the first frame. As with operation 706, such enhancement may be performed as follows. First, all the default bounding boxes that successfully infer a higher confidence score for confidence info in the second frame may be used to generate a first paired patch or box in the second frame. Then, a second paired box in the first frame is determined such that the first and second paired boxes are similar. For example, a patch or default bounding box $A_0$ in the second frame may pair with any of 9 (8+1), 25 (16+8+1) or more patches or default bounding boxes in the first frame, as discussed herein. For example, the similar paired patches may include the same object, but the appearance of the object may differ somewhat due to motion blur, partial occlusion, being in a different pose, etc. Next, a confidence score for the second frame may be modified based on localization information and/or a history max score cache.

In some embodiments, a history max score cache is accessed using the localization information to verify that the confidence score for the second frame is inherited from a historical best detection result for a collocated patch. For example, an index for a patch in the second frame may be 8721 and the patch may have a confidence score from the still image object detector of 0.45 for a cat category (8721, 0.45, cat). If the history max score cache includes a confidence score for the patch index 8721 of 0.78 for the dog category (8721, 0.78, dog), then the confidence score can be modified from (8721, 0.45, cat) to (8721, 0.78, dog) in the feature map for the second frame.

In addition or in the alternative, the feature map for the second frame is enhanced using one or more paired confidence scores from the first frame based on the similarity detection. In some embodiments, the prediction result from the paired still image object detector for the second frame is enhanced by using the similarity detection and comparing the paired confidence score with the confidence score of the corresponding confidence score of the paired patch in the first frame. For example, an enhanced confidence score in the enhanced feature map may be used for each detected paired object patch in the second frame based on a higher confidence score from the feature map (for the paired patch) for the first frame. In an embodiment, the confidence scores corresponding to the patches are compared and the prediction result for the second frame is only updated when the confidence score for the patch in the first frame exceeds the confidence score for the patch in the second frame. For example, a similarity detection result may indicate a patch of index 8721 in the second frame is paired with a patch of index 6618 in the first frame. Furthermore, the prediction result for patch 8721 may be (8721, 0.39, cat) and the prediction result for patch 6618 may be (8721, 0.78, dog). Notably, the prediction result for patch 6618 of the first frame may have been previously enhanced or it may be from a still image object detector. The confidence score of 0.78 (8721, 0.78, dog) is compared with the paired confidence score of 0.39 (6618, 0.39, cat). Since 0.78 is higher than 0.39, the former (dog) wins, and the feature map is enhanced by changing the prediction result therein from (6618, 0.39, cat) to (6618, 0.78, dog). In this example, 6618 is the default bounding box localization index in the second frame. Notably, the localization index does not change while the confidence score and classification (0.78, dog are changed.

As discussed, at operation 807, after processing in the first direction, the enhanced feature map for the frame is cached. Furthermore, operations 803-806 are performed for each pairing of frames sequentially in the first order to generate an enhanced feature map for each frame, which may be characterized as forward enhanced feature maps. Subsequently, the order of the frames is reversed and such processing is repeated in the second direction, opposite the first direction, to generate a second enhanced feature map for each frame, which may be characterized as reverse enhanced feature maps. After such opposite direction processing, operation 807 is used to concatenate, for each frame, the forward enhanced feature map and the reverse enhanced feature map to determine a concatenated feature map for each frame.

Processing continues at operation 808, where the concatenated feature map for each frame is provided to an election layer to generate a final feature map and/or final object detection result data. As discussed, the election layer may be one or more neural network layers or the election layer may determine, for each shared patch of the concatenated feature map, a higher scoring prediction result, retain the higher scoring prediction result, and discard the lower scoring prediction result.

Figure 9:
FIG. 9 is a flow diagram illustrating an example process for performing object detection.
Figure 10:
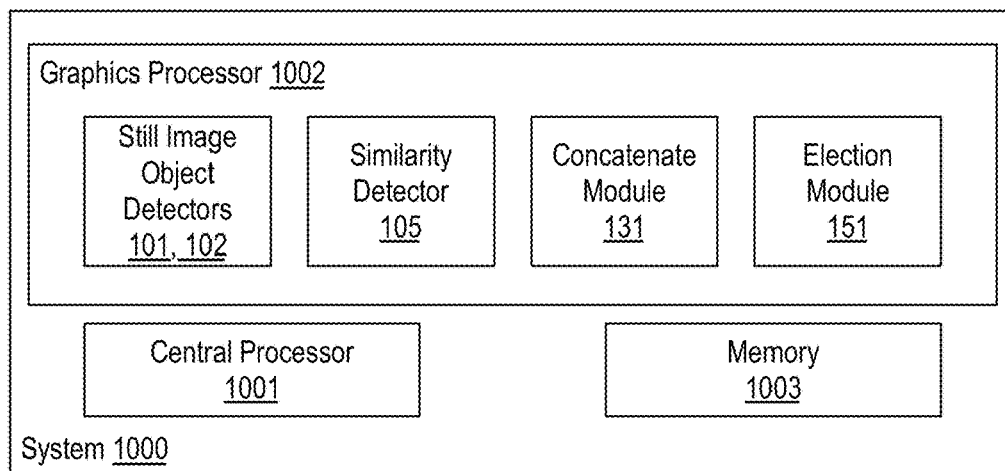
FIG. 10 is an illustrative diagram of an example system for performing object detection.

FIG. 9 is a flow diagram illustrating an example process 900 for performing object detection, arranged in accordance with at least some implementations of the present disclosure. Process 900 may include one or more operations 901-905 as illustrated in FIG. 9. Process 900 may form at least part of an object recognition or detection process. By way of non-limiting example, process 900 may form at least part of an object recognition or detection process performed by device 100 as discussed herein during an implementation phase. Furthermore, process 900 will be described herein with reference to system 1000 of FIG. 10, FIG. 10 is an illustrative diagram of an example system 1000 for performing object detection, arranged in accordance with at least some implementations of the present disclosure. As shown in FIG. 10, system 1000 may include one or more central processing units (CPU) 1001, a graphics processing unit 1002, and memory stores 1003. Also as shown, graphics processing unit 1002 may include one or more still image object detectors 101, 102, one or more similarity detectors 105, one or more concatenate modules 131, and one or more election modules 151. Such modules may be implemented to perform operations as discussed herein. In the example of system 1000, memory stores 1003 may store input frame data, feature maps, enhanced feature maps, concatenated feature maps, resultant object detection data, localization information, confidence information, or any other data or data structure discussed herein.

As shown, in some examples, one or more still image object detectors 101, 102, one or more similarity detectors 105, one or more concatenate modules 131, and one or more election modules 151 are implemented via graphics processing unit 1002. In other examples, one or more or portions of one or more still image object detectors 101, 102, one or more similarity detectors 105, one or more concatenate modules 131, and one or more election modules 151 are implemented via central processing units 1001 or an image processing unit (not shown) of system 1000. In yet other examples, one or more or portions of one or more still image object detectors 101, 102, one or more similarity detectors 105, one or more concatenate modules 131, and one or more election modules 151 are implemented via an imaging processing pipeline, graphics pipeline, or the like.

Graphics processing unit 1002 may include any number and type of graphics processing units that may provide the operations as discussed herein. Such operations may be implemented via software or hardware or a combination thereof. For example, graphics processing unit 1002 may include circuitry dedicated to manipulate frame data, object detection architecture data, etc. obtained from memory stores 1003. Central processing units 1001 may include any number and type of processing units or modules that may provide control and other high level functions for system 1000 and/or provide any operations as discussed herein. Memory stores 1003 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 1003 may be implemented by cache memory. In an embodiment, one or more or portions of one or more still image object detectors 101, 102, one or more similarity detectors 105, one or more concatenate modules 131, and one or more election modules 151 are implemented via an execution unit (EU) of graphics processing unit 1002. The EU may include, for example, programmable logic or circuitry such as a logic core or cores that may provide a wide array of programmable logic functions. In an embodiment, one or more or portions of one or more still image object detectors 101, 102, one or more similarity detectors 105, one or more concatenate modules 131, and one or more election modules 151 are implemented via dedicated hardware such as fixed function circuitry or the like. Fixed function circuitry may include dedicated logic or circuitry and may provide a set of fixed function entry points that may map to the dedicated logic for a fixed purpose or function. In some embodiments, one or more or portions of one or more still image object detectors 101, 102, one or more similarity detectors 105, one or more concatenate modules 131, and one or more election modules 151 are implemented via an application specific integrated circuit (ASIC). The ASIC may include an integrated circuitry customized to perform the operations discussed herein.

Returning to discussion of FIG. 9, process 900 begins at operation 901, where still image object detection is performed on each of a current, a previous, and a subsequent frame of video to determine initial feature maps including object detection localization and confidence scoring for each of multiple potential object patches for the frames. For example, an initial feature map is generated for each of the current frame, the previous frame, and the subsequent frame, which may be characterized as a current frame initial feature map, a previous frame initial feature map, and a previous frame initial feature map, respectively. The still image object detection may be performed using any suitable technique or techniques such as region proposal network (faster R-CNN) detection, region-based fully convolutional network (R-FCN) detection, single-shot multibox (SSD) detection, or you only look once (POLO) detection. The labels current, previous, and subsequent for the frames is meant to indicate an order of processing that may match a temporal order of the frames or may be opposite the temporal order of the frames. Notably, the discussed techniques may first be performed in temporal order and then a reversed order or vice versa.

Processing continues at operation 902, where, based on patch similarity, first and second paired patches between the current and previous frames, respectively, and third and fourth paired patches between the current and subsequent frames, respectively, are detected. Such patch matching based on patch similarity may be performed using any suitable technique or techniques such as applying a pre-trained neural network or the like. In an embodiment, detecting the first and second paired patches and/or the third and fourth paired patches includes implementing a Siamese convolutional neural network.

Processing continues at operation 903, where a first prediction result in the current frame initial feature map for the first paired patch of the current frame is modified to a maximum cached confidence score of the second paired patch of the previous frame to generate a first enhanced feature map including forward object detection localization and confidence scoring for the current frame. The first prediction result may include any suitable object detection prediction information such as a confidence score and a class label. Notably, the localization information (e.g., bounding box or patch location are not updated). The first enhanced feature map may be cached for later use in object detection as is discussed further below. In some embodiments, modifying the first prediction result to the maximum cached confidence score is in response to a confidence scoring of the maximum cached confidence score exceeding a confidence scoring of the first prediction result.

Notably, the maximum cached confidence score is from a previously enhanced feature map for the previous frame (and not from the initial feature map generated at operation 901). In some embodiments, process 900 further includes sequentially generating, prior to said modifying the first prediction result and in a temporal order of the video, a plurality of enhanced feature maps comprising forward object detection localization and confidence scoring for each of a plurality of frames of the video previous to the previous frame and previous frame such that the maximum cached confidence score is in the enhanced feature map for the previous frame. In other embodiments, the forward object detection may be in an order of the frames opposite the temporal order of the video. In some embodiments, process 900 further includes sequentially generating, subsequent to said modifying the first prediction result and in the temporal order of the video, a second plurality of enhanced feature maps including forward object detection localization and confidence scoring for the subsequent frame and each of a plurality of frames of the video subsequent to the subsequent frame. Notably, the discussed enhancements to the initial feature maps may be made sequentially to video frames in a particular (first) order to generate a sequence of enhanced feature maps, each taking advantage of previously made enhancements.

Processing continues at operation 904, where a third prediction result in the current frame initial feature map for the third paired patch of the current frame is modified to a maximum cached confidence score of the fourth object patch of the subsequent frame to generate at least a second enhanced feature map including reverse object detection localization and confidence scoring for the current frame. Notably, operation 904 may enhance the initial feature map for the current frame using enhancements generated by processing frames in a direction opposite to that applied at operation 903. As with the first prediction result, the third prediction result may include any suitable object detection prediction information such as a confidence score and a class label (and the localization information is not updated). The second enhanced feature map may be used immediately and may not need to be cached.

Processing continues at operation 905, where object detection information (e.g., an object detection localization, class, and confidence scoring) for the current frame are determined and output using the first and second feature maps. The object detection information may include any suitable object detection information such as an object detection localization (e.g., bounding box location), class (e.g., semantic class of the object expected to be in the bounding box), and confidence scoring (e.g., a score indicating a confidence the object is in the bounding box) for any number of detected objects or for one or more (even all) default bounding boxes.

The object detection information may be determined using any suitable technique or techniques. In an embodiment, determining the object detection information includes concatenating the first and second enhanced feature maps (e.g., the forward and reverse enhanced feature maps) and providing the concatenated first and second enhanced feature maps to at least one neural network layer to generate the object detection information. In an embodiment, determining the object detection information includes determining a shared object patch between the first and second feature maps (e.g., a patch having the same index, the same default patch, etc.), retaining only object detection localization and confidence scoring from the first feature map for the shared object patch and discarding object detection localization and confidence scoring from the second feature map for the shared object patch in response to the object detection confidence scoring for the shared object patch in the first feature map comparing favorably to the object detection confidence scoring for the shared object patch in the second feature map (e.g., keeping the prediction result for the higher confidence score between the two), and determining the object detection information based at least on the retained object detection localization and confidence scoring from the first feature map. In an embodiment, a feature map of combined highest scores may be provided to a neural network layer, a softmax function, or the like to generate the object detection information. In an embodiment, determining the object detection information includes retaining only object detection localization and confidence scoring for shared object patches between the first and second feature maps based on higher confidence scoring for each of the shared object patches to generate a bidirectional enhanced feature map for the current frame and determining the object detection information based on the bidirectional enhanced feature map. In an embodiment, determining the object detection information based on the bidirectional enhanced feature map includes applying a softmax function to the bidirectional enhanced feature map. In an embodiment, determining the object detection information based on the bidirectional enhanced feature map includes applying at least one neural network layer to the bidirectional enhanced feature map.

Process 900 may provide for generating object detection data or object label data based on a video sequence of input frames. Process 900 may be repeated any number of times either in series or in parallel for any number of video sequences. As discussed, process 900 may provide for high quality object recognition results.

Various components of the systems described herein may be implemented in software, firmware, and/or hardware and/or any combination thereof. For example, various components of devices or systems discussed herein may be provided, at least in part, by hardware of a computing System-on-a-Chip (SoC) such as may be found in a computing system such as, for example, a computer, a laptop computer, a tablet, or a smart phone. For example, such components or modules may be implemented via a multi-core SoC processor. Those skilled in the art may recognize that systems described herein may include additional components that have not been depicted in the corresponding figures.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the discussed operations, modules, or components discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 11:
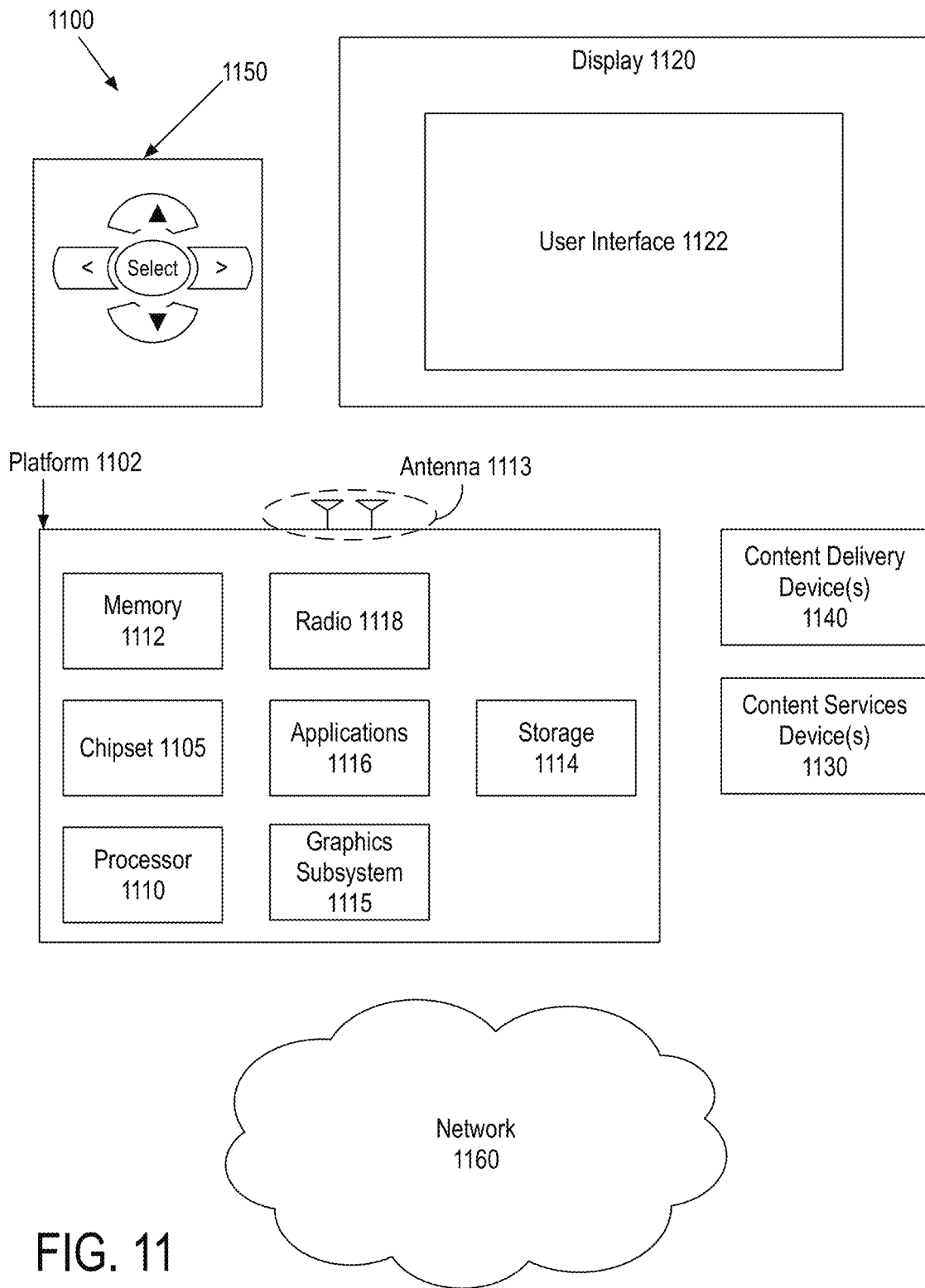
FIG. 11 is an illustrative diagram of an example system.

FIG. 11 is an illustrative diagram of an example system 1100, arranged in accordance with at least some implementations of the present disclosure. In various implementations, system 1100 may be a computing system although system 1100 is not limited to this context. For example, system 1100 may be incorporated into a personal computer (PC), laptop computer, ultra-laptop computer, tablet, phablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, peripheral device, gaming console, wearable device, display device, all-in-one device, two-in-one device, and so forth.

In various implementations, system 1100 includes a platform 1102 coupled to a display 1120. Platform 1102 may receive content from a content device such as content services device(s) 1130 or content delivery device(s) 1140 or other similar content sources such as a camera or camera module or the like. A navigation controller 1150 including one or more navigation features may be used to interact with, for example, platform 1102 and/or display 1120. Each of these components is described in greater detail below.

In various implementations, platform 1102 may include any combination of a chipset 1105, processor 1110, memory 1112, antenna 1113, storage 1114, graphics subsystem 1115, applications 1116 and/or radio 1118, Chipset 1105 may provide intercommunication among processor 1110, memory 1112, storage 1114, graphics subsystem 1115, applications 1116 and/or radio 1118. For example, chipset 1105 may include a storage adapter (not depicted) capable of providing intercommunication with storage 1114.

Processor 1110 may be implemented as a Complex Instruction Set Computer (CISC) or Reduced instruction Set Computer (RISC) processors, x86 instruction set compatible processors, multi-core, or any other microprocessor or central processing unit (CPU). In various implementations, processor 1110 may be dual-core processor(s), dual-core mobile processor(s), and so forth.

Memory 1112 may be implemented as a volatile memory device such as, but not limited to, a Random Access Memory (RAM), Dynamic Random Access Memory (DRAM), or Static RAM (SRAM).

Storage 1114 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1114 may include technology to increase the storage performance enhanced protection for valuable digital media when multiple hard drives are included, for example.

Graphics subsystem 1115 may perform processing of images such as still images, graphics, or video for display. Graphics subsystem 1115 may be a graphics processing unit (GPU), a visual processing unit (VPU), or an image processing unit, for example. In some examples, graphics subsystem 1115 may perform scanned image rendering as discussed herein. An analog or digital interface may be used to communicatively couple graphics subsystem 1115 and display 1120. For example, the interface may be any of a High-Definition Multimedia interface, DisplayPort, wireless LOW, and/or wireless HD compliant techniques. Graphics subsystem 1115 may be integrated into processor 1110 or chipset 1105. In some implementations, graphics subsystem 1115 may be a stand-alone device communicatively coupled to chipset 1105.

The image processing techniques described herein may be implemented in various hardware architectures. For example, image processing functionality may be integrated within a chipset. Alternatively, a discrete graphics and/or image processor and/or application specific integrated circuit may be used. As still another implementation, the image processing may be provided by a general purpose processor, including a multi-core processor. In further embodiments, the functions may be implemented in a consumer electronics device.

Radio 1118 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1118 may operate in accordance with one or more applicable standards in any version.

In various implementations, display 1120 may include any flat panel monitor or display. Display 1120 may include, for example, a computer display screen, touch screen display, video monitor, television-like device, and/or a television. Display 1120 may be digital and/or analog. In various implementations, display 1120 may be a holographic display. Also, display 1120 may be a transparent surface that may receive a visual projection. Such projections may convey various forms of information, images, and/or objects. For example, such projections may be a visual overlay for a mobile augmented reality (MAR) application. Under the control of one or more software applications 1116, platform 1102 may display user interface 1122 on display 1120.

In various implementations, content services device(s) 1130 may be hosted by any national, international and/or independent service and thus accessible to platform 1102 via the Internet, for example. Content services device(s) 1130 may be coupled to platform 1102 and/or to display 1120. Platform 1102 and/or content services device(s) 1130 may be coupled to a network 1160 to communicate (e.g., send and/or receive) media information to and from network 1160, Content delivery device(s) 1140 also may be coupled to platform 1102 and/or to display 1120.

In various implementations, content services device(s) 1130 may include a cable television box, personal computer, network, telephone, Internet enabled devices or appliance capable of delivering digital information and/or content, and any other similar device capable of uni-directionally or bi-directionally communicating content between content providers and platform 1102 and/display 1120, via network 1160 or directly. It will be appreciated that the content may be communicated uni-directionally and/or bi-directionally to and from any one of the components in system 1100 and a content provider via network 1160. Examples of content may include any media information including, for example, video, music, medical and gaming information, and so forth.

Content services device(s) 1130 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1102 may receive control signals from navigation controller 1150 having one or more navigation features. The navigation features of navigation controller 1150 may be used to interact with user interface 1122, for example. In various embodiments, navigation controller 1150 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1150 may be replicated on a display (e.g., display 1120) by movements of a pointer, cursor, focus ring, or other visual indicators displayed on the display. For example, under the control of software applications 1116, the navigation features located on navigation controller 1150 may be mapped to virtual navigation features displayed on user interface 1122, for example. In various embodiments, navigation controller 1150 may not be a separate component but may be integrated into platform 1102 and/or display 1120. The present disclosure, however, is not limited to the elements or in the context shown or described herein.

In various implementations, drivers (not shown) may include technology to enable users to instantly turn on and off platform 1102 like a television with the touch of a button after initial boot-up, when enabled, for example. Program logic may allow platform 1102 to stream content to media adaptors or other content services device(s) 1130 or content delivery device(s) 1140 even when the platform is turned "off." In addition, chipset 1105 may include hardware and/or software support for 5.1 surround sound audio and/or high definition 10.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1100 may be integrated. For example, platform 1102 and content services device(s) 1130 may be integrated, or platform 1102 and content delivery device(s) 1140 may be integrated, or platform 1102, content services device(s) 1130, and content delivery device(s) 1140 may be integrated, for example. In various embodiments, platform 1102 and display 1120 may be an integrated unit. Display 1120 and content service device(s) 1130 may be integrated, or display 1120 and content delivery device(s) 1140 may be integrated, for example. These examples are not meant to limit the present disclosure.

In various embodiments, system 1100 may be implemented as a wireless system, a wired system, or a combination of both. When implemented as a wireless system, system 1100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1100 may include components and interfaces suitable for communicating over wired communications media, such as input/output (PO) adapters, physical connectors to connect the 110 adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1102 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 11.

Figure 12:
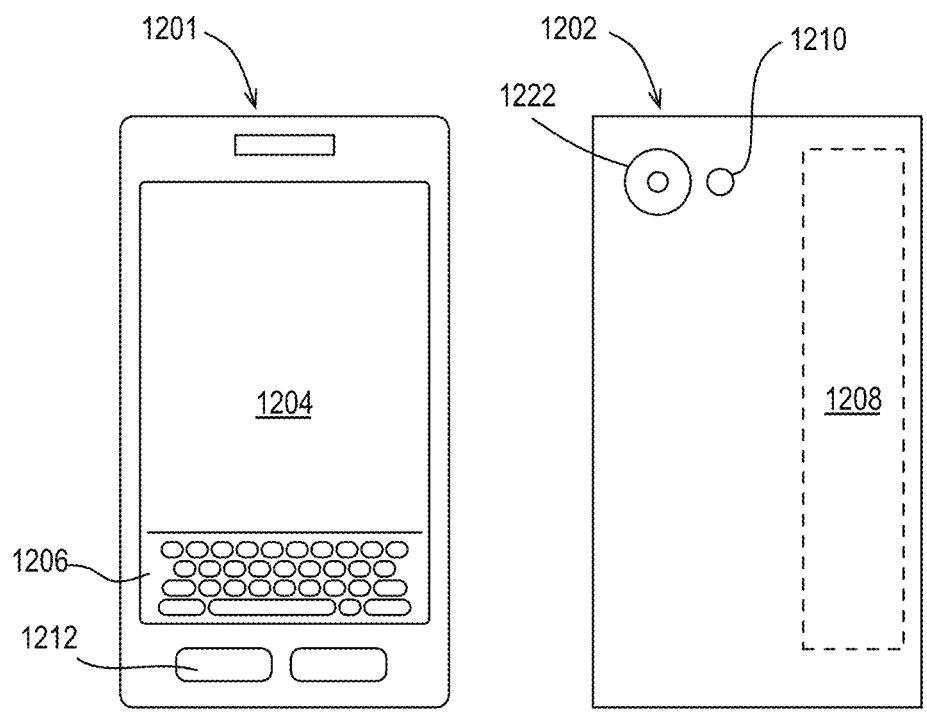
FIG. 12 illustrates an example device, all arranged in accordance with at least some implementations of the present disclosure.

As described above, system 1100 may be embodied in varying physical styles or form factors. FIG. 12 illustrates an example small form factor device 1200, arranged in accordance with at least some implementations of the present disclosure. In some examples, system 1100 may be implemented via device 1200. In other examples, other systems, components, or modules discussed herein or portions thereof may be implemented via device 1200. In various embodiments, for example, device 1200 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smartphone, smart tablet or smart mobile television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be implemented by a motor vehicle or robot, or worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smartphone capable of executing computer applications, as well as voice communications and/or data communications. Although some embodiments may be described with a mobile computing device implemented as a smartphone by way of example, it may be appreciated that other embodiments may be implemented using other wireless mobile computing devices as well. The embodiments are not limited in this context.

As shown in FIG. 12, device 1200 may include a housing with a front 1201 and a back 1202. Device 1200 includes a display 1204, an input/output (I/O) device 1206, a color camera 1222, and an integrated antenna 1208. For example, color camera 1222 may attain video frames for processing as discussed herein. Device 1200 also may include navigation features 1212. I/O device 1206 may include any suitable I/O device for entering information into a mobile computing device. Examples for I/O device 1206 may include an alphanumeric keyboard, a numeric keypad, a touch pad, input keys, buttons, switches, microphones, speakers, voice recognition device and software, and so forth. Information also may be entered into device 1200 by way of microphone (not shown), or may be digitized by a voice recognition device. As shown, device 1200 may include color camera 1222 and a flash 1210 integrated into back 1202 (or elsewhere) of device 1200. In other examples, color camera 1222 and flash 1210 may be integrated into front 1201 of device 1200 or both front and back sets of cameras may be provided.

Color camera 1222 and flash 1210 may be components of a camera module to originate color image data with IR texture correction that may be processed into an image or streaming video that is output to display 1204 and/or communicated remotely from device 1200 via antenna 1208 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A system for performing object detection, comprising:
   a memory to store at least a portion of one or more of a current, a previous, and a subsequent frame of video; and
   a processor coupled to the memory, the processor to:
      generate a current frame initial feature map comprising object detection scoring for the current frame;
      detect, based on patch similarity, first and second paired patches between the current and previous frames, respectively, and third and fourth paired patches between the current and subsequent frames, respectively;
      increase a first prediction result in the current frame initial feature map for the first paired patch to a score of the second paired patch or increase a second prediction result in the current frame initial feature map for the third paired patch to a score of the fourth paired patch to generate an enhanced feature map; and
      determine one or more of an object detection localization, class, and confidence scoring for the current frame using the enhanced feature map.

2. The system of claim 1, wherein the score of the second paired patch comprises a maximum cached confidence score of the second paired patch.

3. The system of claim 2, the processor to:
   generate a plurality of enhanced feature maps comprising forward object detection localization and confidence scoring for each of a plurality of frames of the video previous to the previous frame and for the previous frame, wherein the maximum cached confidence score is in the enhanced feature map for the previous frame.

4. The system of claim 1, wherein the first prediction result is increased to the score of the second paired patch to generate the enhanced feature map and the second prediction result is increased to the score of the fourth paired patch to generate a second enhanced feature map.

5. The system of claim 4, wherein the processor to determine the one or more of the object detection localization, class, and confidence comprises the processor to:
   concatenate the enhanced feature map and the second enhanced feature map; and
   provide the concatenated feature maps to at least one neural network layer to generate the one or more of the object detection localization, class, and confidence.

6. The system of claim 4, wherein the processor to determine the one or more of the object detection localization, class, and confidence comprises the processor to:
   determine a shared object patch between the enhanced feature map and the second enhanced feature map;
   retain object detection localization and confidence scoring from the enhanced feature map for the shared object patch and discard object detection localization and confidence scoring from the second enhanced feature map for the shared object patch in response to the object detection confidence scoring for the shared object patch in the enhanced feature map comparing favorably to the object detection confidence scoring for the shared object patch in the second enhanced feature map; and
   determine the one or more of the object detection localization, class, and confidence scoring based at least on the retained object detection localization and confidence scoring from the enhanced feature map.

7. The system of claim 4, wherein the processor to determine the one or more of the object detection localization, class, and confidence comprises the processor to:
   retain object detection localization and confidence scoring for shared object patches between the enhanced feature map and the second enhanced feature map based on higher confidence scoring for each of the shared object patches to generate a bidirectional enhanced feature map for the current frame; and
   determine the one or more of the object detection localization, class, and confidence scoring based on the bidirectional enhanced feature map.

8. A computer-implemented method for performing object detection, comprising:
   receiving a current, a previous, and a subsequent frame of video;
   generating a current frame initial feature map comprising object detection scoring for the current frame;
   detecting, based on patch similarity, first and second paired patches between the current and previous frames, respectively, and third and fourth paired patches between the current and subsequent frames, respectively;

increasing a first prediction result in the current frame initial feature map for the first paired patch to a score of the second paired patch or increasing a second prediction result in the current frame initial feature map for the third paired patch to a score of the fourth paired patch to generate an enhanced feature map; and determining one or more of an object detection localization, class, and confidence scoring for the current frame using the enhanced feature map.

9. The method of claim 8, wherein the score of the second paired patch comprises a maximum cached confidence score of the second paired patch.

10. The method of claim 9, further comprising:

generating a plurality of enhanced feature maps comprising forward object detection localization and confidence scoring for each of a plurality of frames of the video previous to the previous frame and for the previous frame, wherein the maximum cached confidence score is in the enhanced feature map for the previous frame.

11. The method of claim 8, wherein the first prediction result is increased to the score of the second paired patch to generate the enhanced feature map and the second prediction result is increased to the score of the fourth paired patch to generate a second enhanced feature map.

12. The method of claim 11, wherein determining the one or more of the object detection localization, class, and confidence comprises:

concatenating the enhanced feature map and the second enhanced feature map; and providing the concatenated feature maps to at least one neural network layer to generate the one or more of the object detection localization, class, and confidence.

13. The method of claim 11, wherein determining the one or more of the object detection localization, class, and confidence comprises:

determining a shared object patch between the enhanced feature map and the second enhanced feature map;

retaining object detection localization and confidence scoring from the enhanced feature map for the shared object patch and discard object detection localization and confidence scoring from the second enhanced feature map for the shared object patch in response to the object detection confidence scoring for the shared object patch in the enhanced feature map comparing favorably to the object detection confidence scoring for the shared object patch in the second enhanced feature map; and determining the one or more of the object detection localization, class, and confidence scoring based at least on the retained object detection localization and confidence scoring from the enhanced feature map.

14. The method of claim 11, wherein determining the one or more of the object detection localization, class, and confidence comprises:

retaining object detection localization and confidence scoring for shared object patches between the enhancement feature map and the second enhanced feature map based on higher confidence scoring for each of the shared object patches to generate a bidirectional enhanced feature map for the current frame; and determining the one or more of the object detection localization, class, and confidence scoring based on the bidirectional enhanced feature map.

15. At least one non-transitory machine readable medium comprising a plurality of instructions that, in response to being executed on a computing device, cause the computing device to perform object detection by:

receiving a current, a previous, and a subsequent frame of video;

generating a current frame initial feature map comprising object detection scoring for the current frame;

detecting, based on patch similarity, first and second paired patches between the current and previous frames, respectively, and third and fourth paired patches between the current and subsequent frames, respectively;

increasing a first prediction result in the current frame initial feature map for the first paired patch to a score of the second paired patch or increasing a second prediction result in the current frame initial feature map for the third paired patch to a score of the fourth paired to generate an enhanced feature map; and determining one or more of an object detection localization, class, and confidence scoring for the current frame using the enhanced feature map.

16. The non-transitory machine readable medium of claim 15, wherein the score of the second paired patch comprises a maximum cached confidence score of the second paired patch.

17. The non-transitory machine readable medium of claim 16, further comprising:

generating a plurality of enhanced feature maps comprising forward object detection localization and confidence scoring for each of a plurality of frames of the video previous to the previous frame and for the previous frame, wherein the maximum cached confidence score is in the enhanced feature map for the previous frame.

18. The non-transitory machine readable medium of claim 15, wherein the first prediction result is increased to the score of the second paired patch to generate the enhanced feature map and the second prediction result is increased to the score of the fourth paired patch to generate a second enhanced feature map.

19. The non-transitory machine readable medium of claim 18, wherein determining the one or more of the object detection localization, class, and confidence comprises:

concatenating the enhanced feature map and the second enhanced feature map; and providing the concatenated feature maps to at least one neural network layer to generate the one or more of the object detection localization, class, and confidence.

20. The non-transitory machine readable medium of claim 18, wherein determining the one or more of the object detection localization, class, and confidence comprises:

determining a shared object patch between the enhanced feature map and the second enhanced feature map;

retaining object detection localization and confidence scoring from the enhanced feature map for the shared object patch and discard object detection localization and confidence scoring from the second enhanced feature map for the shared object patch in response to the object detection confidence scoring for the shared object patch in the enhanced feature map comparing favorably to the object detection confidence scoring for the shared object patch in the second enhanced feature map; and determining the one or more of the object detection localization, class, and confidence scoring based at least on the retained object detection localization and confidence scoring from the enhanced feature map.

21. The non-transitory machine readable medium of claim 18, wherein determining the one or more of the object detection localization, class, and confidence comprises:
retaining object detection localization and confidence scoring for shared object patches between the enhanced feature map and the second enhanced feature map based on higher confidence scoring for each of the shared object patches to generate a bidirectional enhanced feature map for the current frame; and
determining the one or more of the object detection localization, class, and confidence scoring based on the bidirectional enhanced feature map.

\* \* \* \* \*